US012619233B2

(12) United States Patent     (10) Patent No.:   US 12,619,233 B2

Sabe et al.     (45) Date of Patent:   *May 5, 2026

(54) CONTROL DEVICE, CONTROL METHOD, AND COMPUTER PROGRAM

(71) Applicant: Sony Group Corporation, Tokyo (JP)

(72) Inventors: Kohtaro Sabe, Tokyo (JP); Peter Duerr, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 85 days.

This patent is subject to a terminal disclaimer.

(21) Appl. No.: 18/443,346

(22) Filed: Feb. 16, 2024

(65) Prior Publication Data

US 2024/0184290 A1    Jun. 6, 2024

Related U.S. Application Data

(63) Continuation of application No. 18/056,730, filed on Nov. 18, 2022, now Pat. No. 11,927,960, which is a
(Continued)

(30) Foreign Application Priority Data

Oct. 17, 2014    (JP) ................................. 2014-212953

(51) Int. Cl.
   B64U 101/26     (2023.01)
   B64U 101/30     (2023.01)
      (Continued)

(52) U.S. Cl.
   CPC ......... G05D 1/0094 (2013.01); G01C 11/025 (2013.01); G05D 1/0038 (2013.01);
      (Continued)

(58) Field of Classification Search
   CPC .... G05D 1/0094; G05D 1/0038; G05D 1/224; G05D 1/689; G01C 11/025; G08G 5/55;
      (Continued)

(56) References Cited

U.S. PATENT DOCUMENTS

| | | | |
|---|---|---|---|
| 4,763,268 A | 8/1988 | Itoh et al. | |
| 6,535,793 B2 | 3/2003 | Allard | |

(Continued)

FOREIGN PATENT DOCUMENTS

| | | |
|---|---|---|
| CN | 101277838 A | 10/2008 |
| CN | 102566580 A | 7/2012 |

(Continued)

OTHER PUBLICATIONS

Office Action issued Oct. 24, 2017 in corresponding Japanese Patent Application No. 2014-212953.

(Continued)

*Primary Examiner* — Robert T Nguyen

(74) *Attorney, Agent, or Firm* — XSENSUS LLP

(57) ABSTRACT

A vehicle control system includes at least one imaging device attached to a vehicle and that captures multiple images, and a control circuit that generates a composite image from the multiple images and displays the composite image on a display unit. The vehicle is operated according to a user operation on a portion of the display unit on which the composite image is being displayed.

20 Claims, 26 Drawing Sheets

Related U.S. Application Data continuation of application No. 16/232,699, filed on Dec. 26, 2018, now Pat. No. 11,520,334, which is a continuation of application No. 15/505,541, filed as application No. PCT/JP2015/005142 on Oct. 9, 2015, now Pat. No. 10,198,003.

(51) Int. Cl.

| | | |
|---|---|---|
| *G01C 11/02* | (2006.01) | |
| *G05D 1/00* | (2024.01) | |
| *G05D 1/224* | (2024.01) | |
| *G05D 1/689* | (2024.01) | |
| *G08G 5/55* | (2025.01) | |
| *G08G 5/57* | (2025.01) | |
| *G08G 5/74* | (2025.01) | |
| *G08G 5/80* | (2025.01) | |
| *H04N 23/698* | (2023.01) | |
| *B64U 10/14* | (2023.01) | |
| *B64U 30/20* | (2023.01) | |

(52) U.S. Cl.
CPC ............. *G05D 1/224* (2024.01); *G05D 1/689* (2024.01); *G08G 5/55* (2025.01); *G08G 5/57* (2025.01); *G08G 5/74* (2025.01); *G08G 5/80* (2025.01); *H04N 23/698* (2023.01); *B64U 10/14* (2023.01); *B64U 30/20* (2023.01); *B64U 2101/26* (2023.01); *B64U 2101/30* (2023.01); *B64U 2201/104* (2023.01); *B64U 2201/20* (2023.01)

(58) Field of Classification Search
CPC .. G08G 5/57; G08G 5/74; G08G 5/80; H04N 23/698; B64U 10/14; B64U 30/20; B64U 2101/26; B64U 2101/30; B64U 2201/104; B64U 2201/20
See application file for complete search history.

(56) References Cited

U.S. PATENT DOCUMENTS

| | | | |
|---|---|---|---|
| 9,056,676 | B1 | 6/2015 | Wang |
| 9,823,658 | B1 | 11/2017 | Loveland et al. |
| 10,061,470 | B2 * | 8/2018 | Richman ................. G01C 21/20 |
| 10,198,003 | B2 * | 2/2019 | Sabe ........................ G05D 1/689 |
| 11,107,240 | B2 * | 8/2021 | Horita .................. G05D 1/0094 |
| 11,520,334 | B2 * | 12/2022 | Sabe ......................... G08G 5/55 |
| 11,927,960 | B2 * | 3/2024 | Sabe .................... H04N 23/698 |
| 2003/0216834 | A1 | 11/2003 | Allard |
| 2008/0109127 | A1 | 5/2008 | Ozaki |
| 2008/0215204 | A1 | 9/2008 | Roy et al. |
| 2009/0015674 | A1 | 1/2009 | Alley et al. |
| 2010/0183409 | A1 | 7/2010 | Checketts et al. |
| 2010/0286859 | A1 | 11/2010 | Feigh et al. |
| 2011/0221767 | A1 | 9/2011 | Kostrzewski et al. |
| 2011/0234801 | A1 | 9/2011 | Yamada et al. |
| 2011/0290937 | A1 | 12/2011 | Salkeld |
| 2012/0050525 | A1 | 3/2012 | Rinner et al. |
| 2012/0232718 | A1 | 9/2012 | Rischmuller et al. |
| 2014/0168420 | A1 | 6/2014 | Naderhirn et al. |
| 2014/0188423 | A1 | 7/2014 | Messinger et al. |
| 2014/0210940 | A1 | 7/2014 | Barnes |
| 2014/0257595 | A1 | 9/2014 | Tillmann |
| 2014/0316616 | A1 * | 10/2014 | Kugelmass .............. G08G 5/26 701/8 |
| 2015/0085068 | A1 | 3/2015 | Becker et al. |
| 2015/0341552 | A1 | 11/2015 | Chen et al. |
| 2017/0221241 | A1 | 8/2017 | Hannah |
| 2018/0184073 | A1 | 6/2018 | Burgess |
| 2019/0250601 | A1 * | 8/2019 | Donahoe ................ G05D 1/101 |
| 2023/0205198 | A1 * | 6/2023 | Bando .................. G05D 1/0221 701/2 |
| 2024/0289978 | A1 * | 8/2024 | Horita .................... G01C 11/02 |

FOREIGN PATENT DOCUMENTS

| | | | |
|---|---|---|---|
| CN | 103942273 | A | 7/2014 |
| EP | 0021060 | A1 | 1/1981 |
| EP | 2360543 | A1 | 8/2011 |
| JP | 7-29099 | A | 1/1995 |
| JP | 2001189888 | A | 7/2001 |
| JP | 2001-292444 | A | 10/2001 |
| JP | 2003-195941 | A | 7/2003 |
| JP | 2003-532218 | A | 10/2003 |
| JP | 2003287573 | A | 10/2003 |
| JP | 2005-269413 | A | 9/2005 |
| JP | 2005284539 | A | 10/2005 |
| JP | 2006-27448 | A | 2/2006 |
| JP | 2006-113858 | A | 4/2006 |
| JP | 2006-171224 | A | 6/2006 |
| JP | 2006-308311 | A | 11/2006 |
| JP | 2009177251 | A | 8/2009 |
| JP | 2010-191502 | A | 9/2010 |
| JP | 2010-210312 | A | 9/2010 |
| JP | 2010-264553 | A | 11/2010 |
| JP | 2011-65202 | A | 3/2011 |
| JP | 2011-174799 | A | 9/2011 |
| JP | 2011-189929 | A | 9/2011 |
| JP | 2012-3706 | A | 1/2012 |
| JP | 2012073520 | A | 4/2012 |
| JP | 2012-140101 | A | 7/2012 |
| JP | 2012-179682 | A | 9/2012 |
| JP | 2013-212832 | A | 10/2013 |
| JP | 2017-503226 | A | 1/2017 |
| WO | 2005/033629 | A2 | 4/2005 |
| WO | 2013/065312 | A1 | 5/2013 |
| WO | 2016/015251 | A1 | 2/2016 |

OTHER PUBLICATIONS

Office Action issued Apr. 3, 2018 in Japanese Patent Application No. 2014-212953.

IRIS Operation Manual, Developer Edition—3D Robotics, Inc., pp. 1-35, Oct. 16, 2013.

Dr. B. Rinner et al., "Resource Aware and Incremental Mosaics of Wide Areas from Small-Scale UAVS," Alpen-Adria Universitat Klagenfurt—Institute of Networked and Embedded Systems, Dissertation, pp. 1-142, Aug. 2014.

Office Action dated Oct. 1, 2019, issued in corresponding Japanese Application No. 2018-153028, 7 pages.

Office Action issued Apr. 21, 2020 in Japanese Patent Application No. 2018-153028, 7 pages.

Office Action issued Jul. 30, 2020 in Chinese Patent Application No. 201811272015.8, 20 pages.

* cited by examiner

CONTROL DEVICE, CONTROL METHOD, AND COMPUTER PROGRAM

CROSS-REFERENCE TO RELATED APPLICATIONS

This application is a continuation of U.S. application Ser. No. 18/056,730, filed Nov. 18, 2022, which is a continuation of U.S. application Ser. No. 16/232,699, filed Dec. 26, 2018 (now U.S. Pat. No. 11,520,334), which is a continuation of U.S. application Ser. No. 15/505,541, filed Feb. 21, 2017 (now U.S. Pat. No. 10,198,003), which is a National Stage Entry of PCT/JP2015/005142 filed Oct. 9, 2015, which claims the benefit of Japanese Priority Patent Application JP 2014-212953 filed Oct. 17, 2014, the entire contents of each of which are incorporated herein by reference.

TECHNICAL FIELD

The present disclosure relates to a control device, a control method, and a computer program.

BACKGROUND ART

A technology relating to a method for capturing photographs using a camera installed in a radio-controllable flying body has been disclosed (for example, refer to Patent Literature 1). Using the camera installed in such a flying body, it is possible to capture photographs from the sky or a position in which a tripod is difficult to set. Capturing using a camera installed in a flying body brings various advantages in that costs can be suppressed, and safe capturing, capturing at a low altitude or in a narrow place, capturing in proximity to a target, and the like are possible in comparison to when a real aircraft or helicopter is used.

CITATION LIST

Patent Literature

[PTL 1]
JP 2006-27448A

SUMMARY

Technical Problem

In order to operate a mobile object such as a vehicle which may be an automobile, a flying body or robot equipped with such a camera, a dedicated controller is typically necessary. Here, when the user can simply designate a movement instruction to the mobile object using an image captured by the mobile object, even the user who is unaccustomed to an operation of a mobile object is considered to be able to move the mobile object to a desired position easily.

In this regard, the present disclosure proposes a control system, a control method, and a computer program, which are novel and improved and capable of giving an instruction to move the mobile object intuitively using an image obtained by capturing the mobile object.

Solution to Problem

According to one aspect of the present disclosure, there is provided a vehicle control system, comprising at least one imaging device attached to a vehicle and configured to capture a plurality of images; and a control circuit configured to generate a composite image from the plurality of images, and to display the composite image on a display unit, wherein the vehicle is operated according to a user operation on a portion of the display unit on which the composite image is being displayed.

According to another aspect of the present disclosure, there is provided a vehicle control method, comprising capturing, via at least one imaging device attached to a vehicle, a plurality of images; generating a composite image from the plurality of images, and displaying the composite image on a display unit; and operating the vehicle according to a user operation on a portion of the display unit on which the composite image is being displayed.

According to another aspect of the present disclosure, computer system, comprising: at least one processing unit; and a memory, the memory including a non-transitory computer-readable medium storing instructions that, when executed by the at least one processing unit, cause the computer system to cause at least one imaging device attached to a vehicle to capture a plurality of images, generate a composite image from the plurality of images, display the composite image on a display unit, and operate the vehicle according to a user operation on a portion of the display unit on which the composite image is being displayed.

Advantageous Effects of Invention

As described above, according to one or more of embodiments of the present disclosure, a control system, a control method, and a computer program, which are novel and improved and capable of giving an instruction to move the mobile object intuitively using an image captured by the mobile object are provided.

Note that the effects described above are not necessarily limited, and along with or instead of the effects, any effect that is desired to be introduced in the present specification or other effects that can be expected from the present specification may be exhibited.

DESCRIPTION OF EMBODIMENTS

Figure 1:
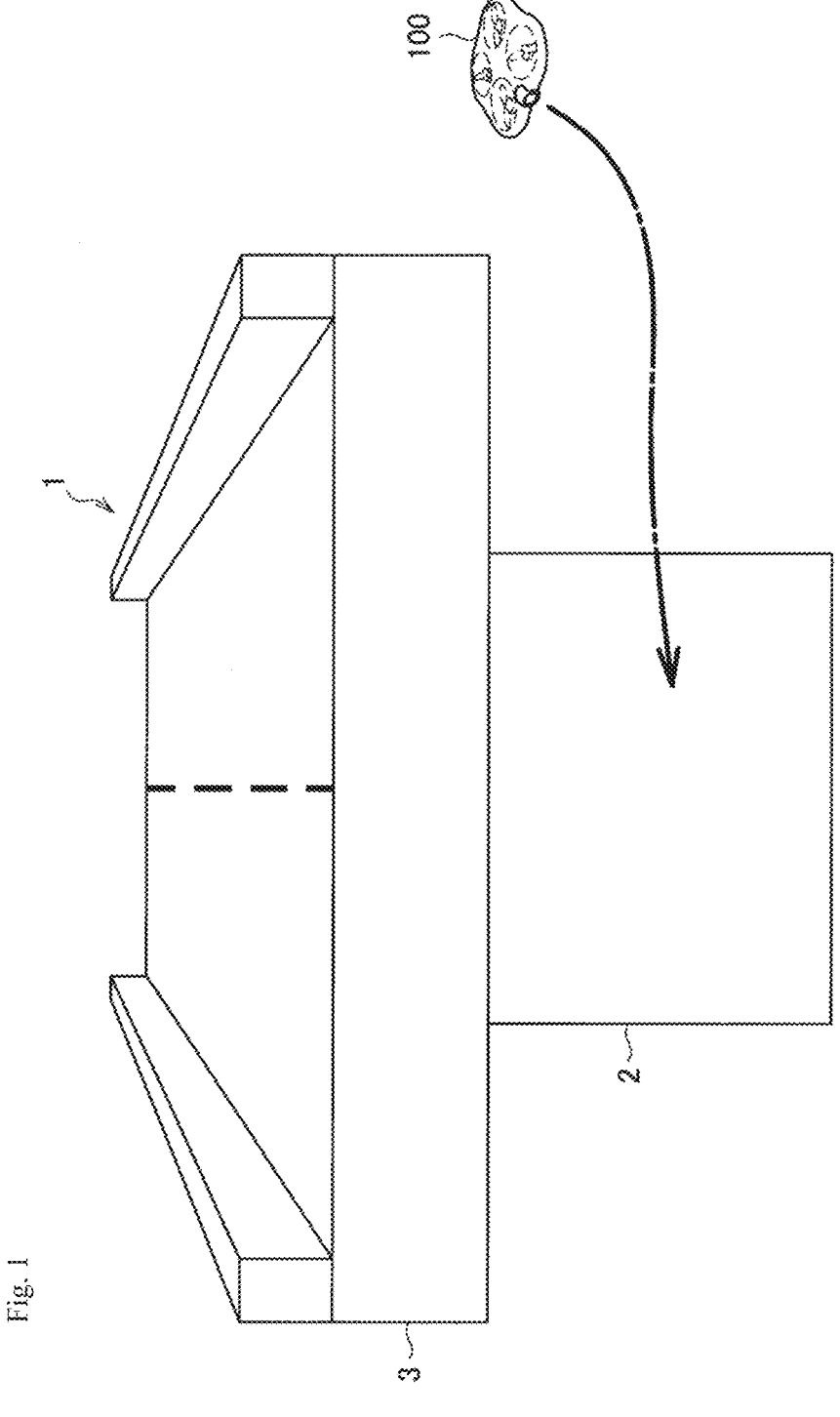
FIG. 1 is an explanatory diagram for describing an overview of an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

A description will proceed in the following order.

1. Embodiment of present disclosure
1.1. Overview 1.2. Exemplary system configuration
1.3. Exemplary function configuration
1.4. Exemplary operation
1.5. Exemplary damage data generation
1.5.1. Exemplary function configuration
1.5.2. Exemplary operation
1.6. Exemplary flight instruction using combined image
2. Conclusion

1. Embodiment of Present Disclosure (1.1. Overview)

In detailed description of an embodiment of the present disclosure, an overview of an embodiment of the present disclosure will be first described.

Checking a state of a structure by humans is indispensable in operation and maintenance of a structure such as a road, a bridge, a tunnel, or a building. Typically, for visual checking of such a structure, commonly, a worker approaches a structure, and visually checks whether or not damage such as corrosion or a crack or looseness of a coupling member such as a bolt has occurred in a structure or performs a hammering test to check the presence or absence of such abnormalities.

For operation and maintenance of a bridge, particularly, a concrete bridge, for example, it is necessary to set up a scaffold at a back side portion of a bridge pier or a bridge girder for a worker who performs a visual inspection and a hammering test of a bridge girder or a bridge pier, or it is necessary to close some lanes or all lanes in order to secure safety of a worker or place a work vehicle. For this reason, a cost necessary for an inspection, a cost necessary for a placement of a road guide person due to road closing, and a traffic jam of a detour occurring by road closing can be problematic.

Further, for example, when built above a river or the sea, there is a bridge at which it is not easy to set up a scaffold or it is difficult to set up a scaffold. Thus, in view of such circumstances, a technique capable of implementing an inspection of a structure at a low cost with high safety without influencing traffic is desirable.

Thus, the disclosers of the present application have reviewed a technique capable of implementing an inspection of a structure at a low cost with high safety without influencing traffic in view of such circumstances. Further, the disclosers of the present application have ended up with a proposal of a technique capable of implementing an inspection at a low cost with high safety without influencing traffic using a flying body equipped with an imaging device (in the following description, the flying body equipped with the imaging device is also referred to as a "hovering camera") which will be described below.

FIG. 1 is an explanatory diagram for describing an overview of an embodiment of the present disclosure. FIG. 1 schematically illustrates, for example, a bridge 1 constructed of concrete. When the bridge 1 constructed of concrete is inspected, in a related art, it is necessary to set up a scaffold at a back side portion of a bridge pier 2 or a bridge girder 3 in order for a worker to visually inspect whether or not damage such as a crack or corrosion has occurred, or it is necessary to close some lanes or all lanes in order to secure safety of a worker or place a work vehicle.

In an embodiment of the present disclosure, a hovering camera 100 is used when the bridge 1 is inspected. The hovering camera 100 is a flying body equipped with an imaging device which is configured to perform an automatic flight according to flight information (including a flight path and information of an imaging position of a still image in the present embodiment) which is set in advance. Examples of the information of the imaging position of the still image include a position at which an imaging process is executed, an imaging direction, and a traveling time to a position at which a next imaging process is executed.

For example, when a back side (a bottom surface) of the bridge girder 3 is inspected, the hovering camera 100 is operated to perform an automatic flight to capture the back side of the bridge girder 3. By causing the hovering camera 100 to capture the back side of the bridge girder 3, it is unnecessary to set up a scaffold at the back side portion of the bridge pier 2 or the bridge girder 3 for an inspection of the bridge girder 3, the frequency of lane closing is reduced or it is unnecessary to perform lane closing. Further, for example, when the side (side surface) of the bridge girder 3 is inspected, the hovering camera 100 is operated to perform an automatic flight to capture the side of the bridge girder 3. Thus, by causing the hovering camera 100 to perform an automatic flight and causing the hovering camera 100 to capture the back side or the side of the bridge girder 3, it is possible to inspect the bridge 1 at a low cost while securing the safety of a worker without influencing traffic.

In order to cause the hovering camera 100 to perform an automatic flight to capture the back side of the bridge girder 3, it is necessary to set a flight path of the hovering camera 100 and set information of an imaging position of a still image at the position of the back side of the bridge girder 3. In embodiment of the present disclosure, it is a purpose to make it possible to perform an efficient inspection of the bridge 1 by efficiently creating flight information to be set for the hovering camera 100 using information related to a typical condition of the bridge 1.

The overview of the embodiment of the present disclosure has been described above. Next, an exemplary configuration of an inspection system according to an embodiment of the present disclosure will be described.

(1.2. Exemplary System Configuration)

Figure 2:
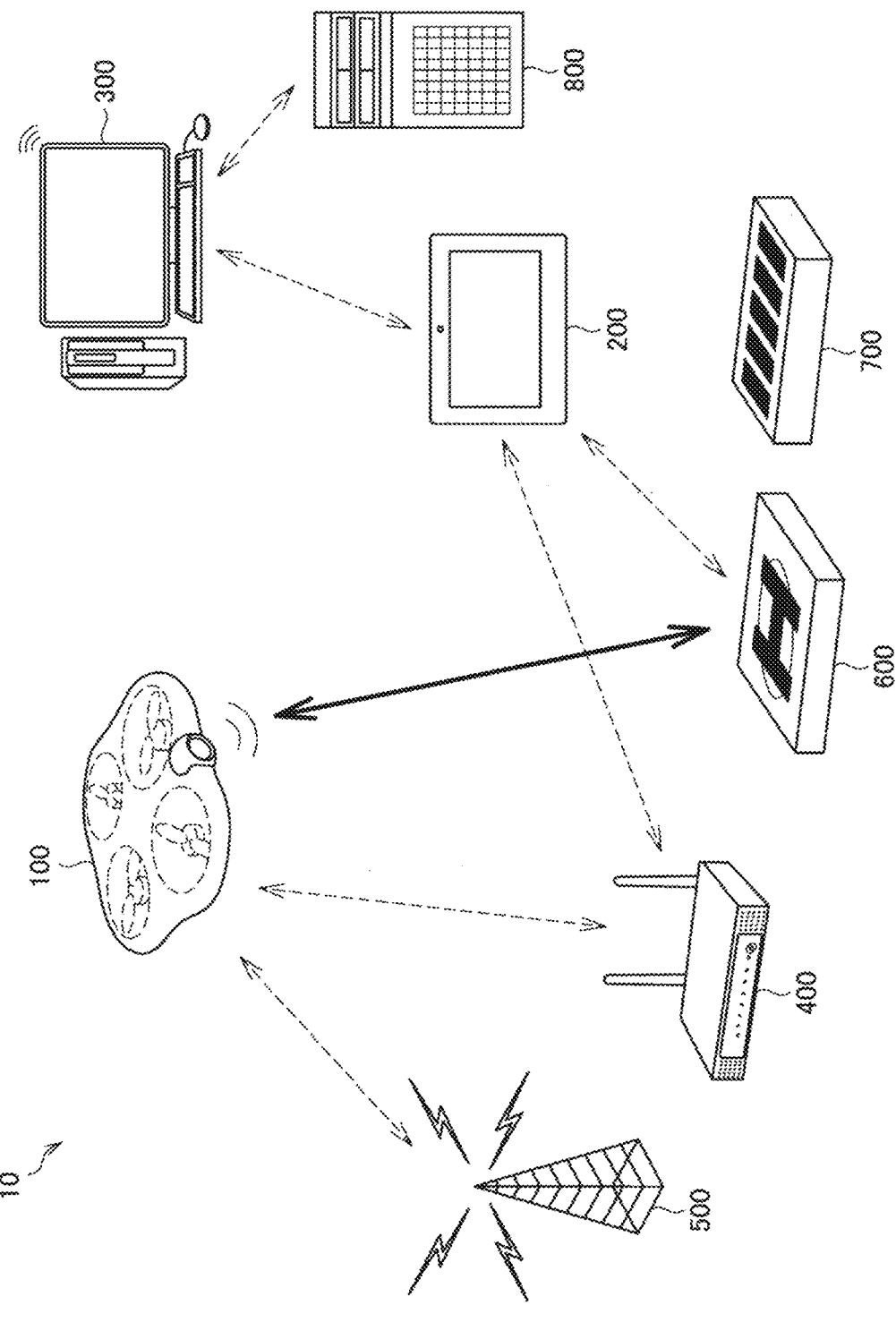
FIG. 2 is an explanatory diagram illustrating an exemplary system configuration of an inspection system 10 according to an embodiment of the present disclosure.

FIG. 2 is an explanatory diagram illustrating an exemplary system configuration of an inspection system 10 according to an embodiment of the present disclosure. The inspection system 10 according to the embodiment of the present disclosure illustrated in FIG. 2 is a system that is configured to efficiently inspect a structure, for example, the bridge 1. An exemplary system configuration of the inspection system 10 according to the embodiment of the present disclosure will be described below with reference to FIG. 2.

As illustrated in FIG. 2, the inspection system 10 according to the embodiment of the present disclosure includes the hovering camera 100, a control terminal 200, an information processing device 300, a wireless relay node 400, a position estimation node 500, a base station 600, a charging station 700, and a server device 800.

The hovering camera 100 is an exemplary imaging device of the present disclosure and serves as the flying body equipped with the imaging device described above. The hovering camera 100 is a flying body configured to be able to perform an automatic flight based on a designated flight path and capture a still image at a designated imaging position through the imaging device. The hovering camera 100 can fly, for example, through four rotors and fly while moving upward, downward, or forward by controlling the rotation of each rotor. Of course, the number of rotors is not limited to the relevant example.

A flight path from a flight start position to a flight end position and the imaging position set for the hovering camera 100 are set as position information of a global positioning system (GPS), for example. Thus, a GPS receiver that receives radio waves from GPS satellites and calculates a current position may be incorporated into the hovering camera 100. The flight path set for the hovering camera 100 may be set using all of a latitude, a longitude, and an altitude as GPS position information or may be set using only a latitude and a longitude as the GPS position information, and, for example, a relative height from the base station 600 which will be described below may be set as an altitude.

The control terminal 200 is an exemplary control device of the present disclosure and serves as a terminal that executes control related to a flight of the hovering camera 100. As the control related to the flight of the hovering camera 100, for example, the control terminal 200 generates flight information to be transmitted to the hovering camera 100, gives a takeoff instruction to the hovering camera 100, gives a return instruction to the base station 600 which will be described below, or flies the hovering camera 100 when the hovering camera 100 does not fly automatically due to a certain reason. A generation process of the flight information of the hovering camera 100 by the control terminal 200 will be described in detail below but will be described briefly here.

When the flight information of the hovering camera 100 is generated, the control terminal 200 reads the information related to the typical condition of the bridge 1 to be inspected, for example, a typical condition diagram of the bridge 1 to be inspected, and causes the read information to be displayed on a screen. Points on the typical condition diagram of the bridge 1 are associated with points on map data including more detailed GPS information. The associating is preferably performed by at least two sets of points. The typical condition diagram of the bridge 1 is associated with points on the map data including detailed GPS information in advance, and thus the flight path of the hovering camera 100 is defined as GPS values. Then, the control terminal 200 generates the flight path of the hovering camera 100 based on the typical condition diagram of the bridge 1. The flight path of the hovering camera 100 is displayed on the typical condition diagram in a superimposed manner so that it is easily understood by the user (structure inspection worker).

The control terminal 200 may consider a structure or dimension of the bridge 1 or a portion of the bridge 1 to be captured by the hovering camera 100 when generating the flight information of the hovering camera 100. The control terminal 200 may generate the flight information for causing the hovering camera 100 to capture a portion, in detail, considered likely to be damaged when generating the flight information of the hovering camera 100.

As described above, the flight path set to the hovering camera 100 may be set using all of a latitude, a longitude, and an altitude as the GPS position information, but a case in which no altitude data is included in the typical condition diagram of the bridge 1 is considered. When no altitude data is included in the typical condition diagram of the bridge 1, the flight path set to the hovering camera 100 is set using only a latitude and a longitude as the GPS position information, and, for example, a relative height from the base station 600 may be set as an altitude.

When the flight information is set for the hovering camera 100, the control terminal 200 preferably generates the flight information so that a distance from an imaging target surface becomes constant when the hovering camera 100 captures the bridge 1. Since the flight information is generated so that the distance from the imaging target surface becomes constant when the hovering camera 100 captures the bridge 1, the control terminal 200 can cause the hovering camera 100 to generate images having the same scale.

The control terminal 200 is a portable device such as a laptop computer or a tablet terminal, and performs wireless transmission and reception of information to/from the hovering camera 100. The control terminal 200 may perform wireless communication with the hovering camera 100 directly with the hovering camera 100, but since there are cases in which the hovering camera 100 flies beyond a communication range of the control terminal 200 in an inspection of a structure, particularly, the bridge 1, the control terminal 200 may perform wireless communication with the hovering camera 100 through the wireless relay node 400 installed at the time of inspection.

The control terminal 200 acquires an image captured by the imaging device while the hovering camera 100 is flying, and displays the acquired image as necessary. The control terminal 200 may acquire a moving image captured by the imaging device in a streaming manner while the hovering camera 100 is flying and display the acquired moving image. Since the moving image captured by the imaging device is acquired in the streaming manner while the hovering camera 100 is flying and displayed, the control terminal 200 can present a position at which the hovering camera 100 is flying to the user.

The information processing device 300 is a device that processes a variety of information and may be, for example, a device having a function of processing information such as a personal computer (PC), a game machine, or the like. In the present embodiment, the information processing device 300 is a device having a function of displaying, particularly, an image captured by the hovering camera 100 and enables the user to check the state of the bridge 1. The information processing device 300 has a function of calculating an absolute position of damage of the bridge girder 3 from the image captured by the hovering camera 100 and generating damage data which will be described below. The information processing device 300 may have a function of transmitting the generated damage data to the server device 800. Further, the control terminal 200 may have the function of calculating an absolute position of damage of the bridge girder 3 from the image captured by the hovering camera 100 and generating damage data which will be described below.

The information processing device 300 acquires the image captured by the hovering camera 100, for example, from the control terminal 200. The acquiring of the image captured by the hovering camera 100 by the information processing device 300 is not limited to a specific time, and, for example, the information processing device 300 may acquire the image captured by the hovering camera 100 from the control terminal 200 at a time at which one flight of the hovering camera 100 ends.

The wireless relay node 400 is a device that relays wireless communication between the hovering camera 100 and the control terminal 200. As described above, the hovering camera 100 may fly beyond the communication range of the control terminal 200 at the time of inspection of a structure, particularly, the bridge 1. Thus, wireless communication between the hovering camera 100 and the control terminal 200 can be performed through the wireless relay node 400 installed at the time of inspection of a structure. The number of wireless relay nodes 400 is not limited to 1, and a plurality of wireless relay nodes 400 may be installed depending on an inspection range of the bridge 1. Thus, wireless communication between the hovering camera 100 and the control terminal 200 may be performed through a plurality of wireless relay nodes 400. The hovering camera 100 can switch a communication destination between the control terminal 200 and the wireless relay node 400 according to a situation of the radio waves.

The wireless relay node 400 may be installed at an appropriate position on a bridge face (preferably, on a sidewalk) at the time of inspection of the bridge 1. The wireless relay node 400 may be installed so as to be suspended from a parapet of the bridge girder 3. Further, before the inspection of the bridge 1, it is desirable to check whether or not the wireless relay node 400 operates normally, for example, using the control terminal 200 by a certain method.

The position estimation node 500 is a device that causes the hovering camera 100 to estimate a current position. As described above, the flight path of the hovering camera 100 is set, for example, using the GPS position information. At this time, when the radio waves from the GPS satellites are not blocked, the hovering camera 100 can detect the current position with a high degree of accuracy. However, when the hovering camera 100 flies under the bridge girder 3 and so the radio waves from the GPS satellites are blocked by the bridge girder 3 or a multipath occurs, for example, due to reflection of the radio waves by the bridge 1, the hovering camera 100 is unlikely to detect the current position with a high degree of accuracy.

In this regard, in the present embodiment, the position estimation node 500 is installed under the bridge girder 3 in order to enable the hovering camera 100 to acquire the current position accurately. For example, an augmented reality (AR) marker or a GPS signal transmitter may be used as the position estimation node 500.

When the AR marker is used as the position estimation node 500, in order to enable the hovering camera 100 to recognize the current position, for example, position estimation nodes 500 are suspended from both ends of the bridge 1, and the hovering camera 100 is caused to capture the position estimation node 500. Further, the hovering camera 100 that has captured the position estimation node 500 is caused to fly between the designated position estimation nodes 500. The hovering camera 100 can detect the position between the position estimation nodes 500, for example, based on an integration value of a sensor (for example, an inertial measurement unit (IMU) sensor) installed in the hovering camera 100 and a distance to the position estimation node 500 of the movement destination calculated from the captured image. Thus, the hovering camera 100 captures the position estimation node 500 and thus can acquire the current position even under the bridge girder 3 accurately.

Further, when the GPS signal transmitter is used as the position estimation node 500, in order to enable the hovering camera 100 to recognize the current position, for example, position estimation nodes 500 are installed at opposing corners or four corners of the bridge 1. The hovering camera 100 receives the GPS signal transmitted from the position estimation node 500 and thus can acquire the current position accurately even under the bridge girder 3.

The base station 600 is a device installed for takeoff and landing of the hovering camera 100. The base station 600 includes a GPS receiver, and receives the radio waves from the GPS satellites and calculates the current position. The current position calculated by the base station 600 is transmitted to the control terminal 200. Since the current position calculated by the base station 600 is transmitted to the control terminal 200, the control terminal 200 can cause the position of the base station 600 to be displayed on the typical condition diagram of the bridge 1.

The base station 600 may have a function of checking an operation of the hovering camera 100. Examples of the operation check of the hovering camera 100 performed by the base station 600 include a communication function check, an imaging function check, a flight function check, and calibration of various types of sensors. Further, the calibration method of the sensors of the hovering camera 100 is not limited to the method of using the base station 600. For example, as the calibration method of the sensors of the hovering camera 100, a method of fixing the hovering camera 100 in a dedicated calibration and correcting the sensors by rotating the hovering camera 100 in a pitch direction or a roll direction may be used.

The charging station 700 electrically charges a secondary battery installed in the hovering camera 100. The hovering camera 100 uses a battery as a power source, and expends electrical power accumulated in the battery during the flight or the capturing. When the battery installed in the hovering camera 100 is the secondary battery, the charging station 700 can restore electric power expended by the hovering camera 100 by charging the battery. The charging station 700 may charge the hovering camera 100 by connecting a cable or the like to the hovering camera 100 and supplying electric power to the hovering camera 100 or may charge the hovering camera 100 by supplying electric power to the hovering camera 100 by a non-contact power transmission scheme.

The server device 800 is a device that stores various types of data. In the present embodiment, the server device 800 may store damage data generated by the information processing device 300.

The inspection system 10 according to the embodiment of the present disclosure has the configuration illustrated in FIG. 2 and can cause the hovering camera 100 to capture the bridge 1 and acquire the image of the bridge 1. Since the hovering camera 100 is caused to capture the bridge 1, in the inspection system 10 according to the embodiment of the present disclosure, it is unnecessary to set up a scaffold at a bridge pier or a bridge girder, the frequency in which some lanes or all lanes are closed in order to secure safety of a worker is reduced, and it is unnecessary to close lanes, and thus the inspection of the bridge 1 can be efficiently performed at a low cost.

An exemplary system configuration of the inspection system 10 according to the embodiment of the present disclosure has been described above. Next, exemplary function configurations of the hovering camera 100 and the control terminal 200 configuring the inspection system 10 according to the embodiment of the present disclosure will be described.

(1.3. Exemplary Function Configuration)

Figure 3:
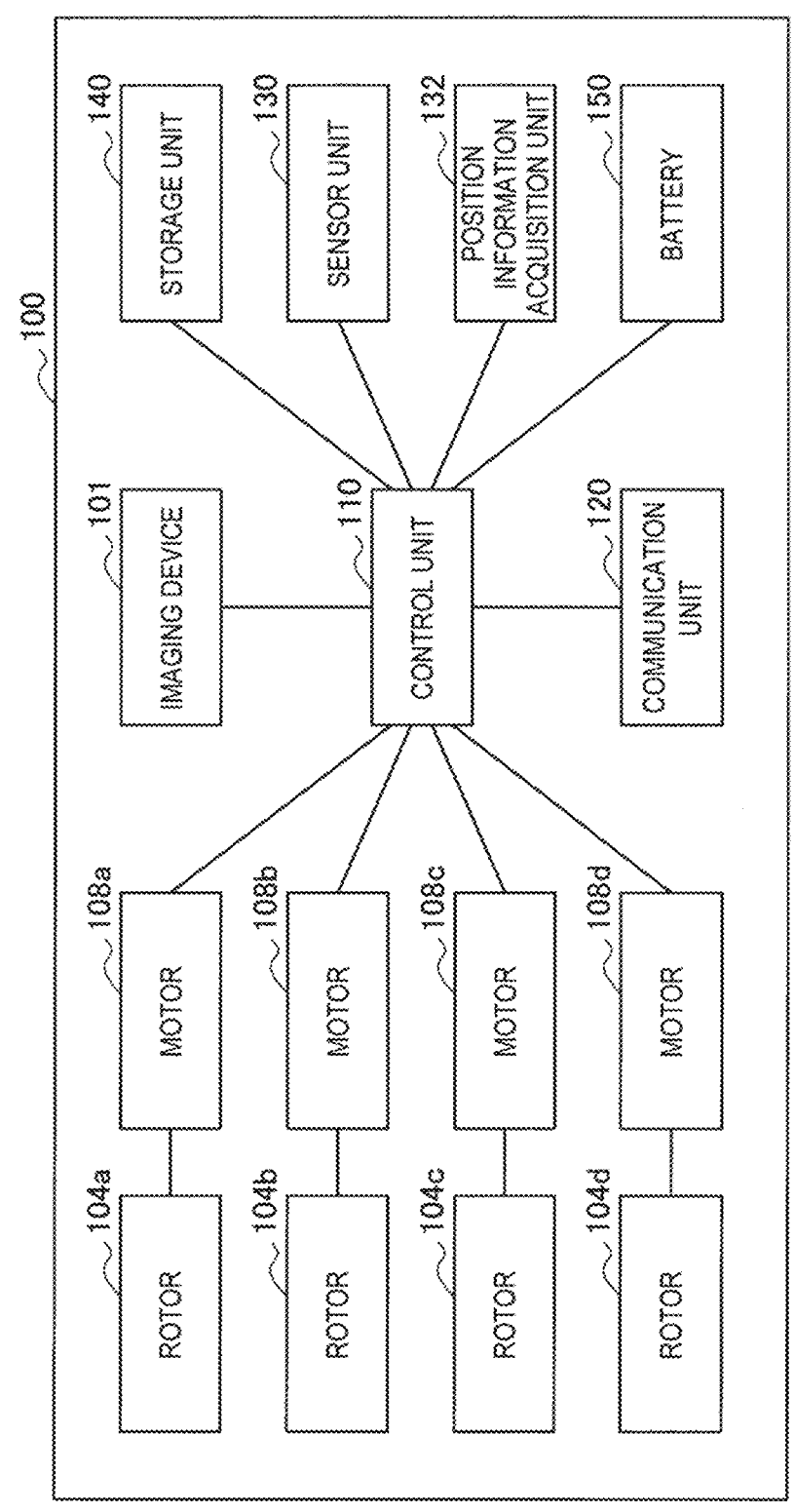
FIG. 3 is an explanatory diagram illustrating an exemplary function configuration of a hovering camera 100 according to an embodiment of the present disclosure.

An exemplary function configuration of the hovering camera 100 according to an embodiment of the present disclosure will be first described. FIG. 3 is an explanatory diagram illustrating an exemplary function configuration of the hovering camera 100 according to an embodiment of the present disclosure. An exemplary function configuration of the hovering camera 100 according to an embodiment of the present disclosure will be described below with reference to FIG. 3.

As illustrated in FIG. 3, the hovering camera 100 according to an embodiment of the present disclosure is configured to include an imaging device 101, rotors 104a to 104d, motors 108a to 108d, a control unit 110, a communication unit 120, a sensor unit 130, a position information acquisition unit 132, a storage unit 140, and a battery 150.

The control unit 110 controls an operation of the hovering camera 100. For example, the control unit 110 can control an adjustment of the rotational speed of the rotors 104a to 104d by an adjustment of the rotational speed of the motors 108a to 108d, the imaging process by the imaging device 101, the transmission and reception processes of information to/from other devices (for example, the control terminal 200) through the communication unit 120, and storage and reading of information in and from the storage unit 140.

In the present embodiment, the control unit 110 controls a flight in which the rotational speed of the motors 108a to 108d is adjusted and execution of the imaging process of the still image by the imaging device 101 based on the flight information transmitted from the control terminal 200. The control unit 110 controls the motors 108a to 108d or the imaging device 101 based on the flight information transmitted from the control terminal 200 and thus can provide an image to the control terminal 200 based on a request of the control terminal 200.

The imaging device 101 is configured with a lens, an image sensor such as a CCD image sensor or a CMOS image sensor, a flash, and the like. The imaging device 101 installed in the hovering camera 100 captures a still image or a moving image according to control from the control terminal 200. The image captured by the imaging device 101 is transmitted from the communication unit 120 to the control terminal 200. In the present embodiment, the imaging device 101 performs the imaging process based on the information of the imaging position of the still image included in the flight information transmitted from the control terminal 200. The image obtained by the imaging process of the imaging device 101 is stored in the storage unit 140 or transmitted from the communication unit 120 to the control terminal 200. When the bottom side of the bridge 1 is captured by the hovering camera 100, since the sun is blocked by the bridge 1 so that brightness is considered to be insufficient, the hovering camera 100 may turn on the flash when the bottom side of the bridge 1 is captured.

The imaging device 101 can change the imaging direction, for example, to an arbitrary direction by the control from the control unit 110. For example, when the horizontal direction of the hovering camera is assumed to be 0°, the capturing can be performed in an imaging direction indicated by a range of +90° vertically. As the imaging device 101 changes the imaging direction, the hovering camera 100 can capture an image in a certain direction and provides a captured image to the control terminal 200. Then, the control unit 110 associates position information (which may include position information obtained by position measurement using the GPS or position measurement using the position estimation node 500. The position measurement using the position estimation node 500 will be described below) of the hovering camera 100 when the imaging device 101 captures a still image, fuselage information (for example, a yaw angle, a pitch angle, acceleration, and an angular velocity) at the time of capturing, and information of the imaging direction as metadata of the still image. As a method of storing the associated metadata, the metadata may be added to an additional information region (for example, a specific region of an Exif format) of still image data, or the metadata may be recorded in an image file, a separate file, or the like as separate data.

The rotors 104a to 104d cause the hovering camera 100 to fly by generating a lift force from rotation thereof. Rotation of the rotors 104a to 104d is caused by rotation of the motors 108*a* to 108*d*. The motors 108*a* to 108*d* cause the rotors 104*a* to 104*d* to rotate. The rotation of the motors 108*a* to 108*d* can be controlled by the control unit 110.

The communication unit 120 performs transmission and reception processes of information to/from the control terminal 200 through wireless communication. The hovering camera 100 transmits images captured by the imaging device 101 from the communication unit 120 to the control terminal 200. In addition, the hovering camera 100 receives instructions relating to flight from the control terminal 200 using the communication unit 120.

The sensor unit 130 is a group of devices that acquire a state of the hovering camera 100, and may include, for example, an acceleration sensor, a gyro sensor, an ultrasonic sensor, a pneumatic sensor, an optical flow sensor, a laser range finder, and the like. The sensor unit 130 can convert an acquired state of the hovering camera 100 into a predetermined signal, and provide the signal to the control unit 110 when necessary. The position information acquisition unit 132 acquires information of a current position of the hovering camera 100 using, for example, the GPS, a vision sensor, or the like. The position information acquisition unit 132 can provide the acquired information of the current position of the hovering camera 100 to the control unit 110 when necessary. The control unit 110 executes control of the flight of the hovering camera 100 based on the flight information received from the control terminal 200 using the information of the current position of the hovering camera 100 acquired by the position information acquisition unit 132.

The sensor unit 130 detects an obstacle that may interfere with a flight at the time of the flight. As the sensor unit 130 detects an obstacle, the hovering camera 100 can provide information related to the detected obstacle to the control terminal 200.

The storage unit 140 stores a variety of information. Examples of the information stored in the storage unit 140 include the flight information of the hovering camera 100 transmitted from the control terminal 200 and an image captured by the imaging device 101.

The battery 150 accumulates electric power for operating the hovering camera 100. The battery 150 may be a primary battery in which only discharging is possible or may be a secondary battery in which charging is also possible, but when the battery 150 is the secondary battery, for example, the battery 150 can be supplied with electric power from the charging station 700 illustrated in FIG. 2.

The hovering camera 100 according to an embodiment of the present disclosure may have the configuration illustrated in FIG. 3 and thus can perform an automatic flight based on the flight path included in the flight information transmitted from the control terminal 200 and execute the imaging process based on the information of the imaging position of the still image included in the flight information transmitted from the control terminal 200.

The exemplary function configuration of the hovering camera 100 according to an embodiment of the present disclosure has been described above with reference to FIG. 3. Next, an exemplary function configuration of the control terminal 200 according to an embodiment of the present disclosure will be described.

Figure 4:
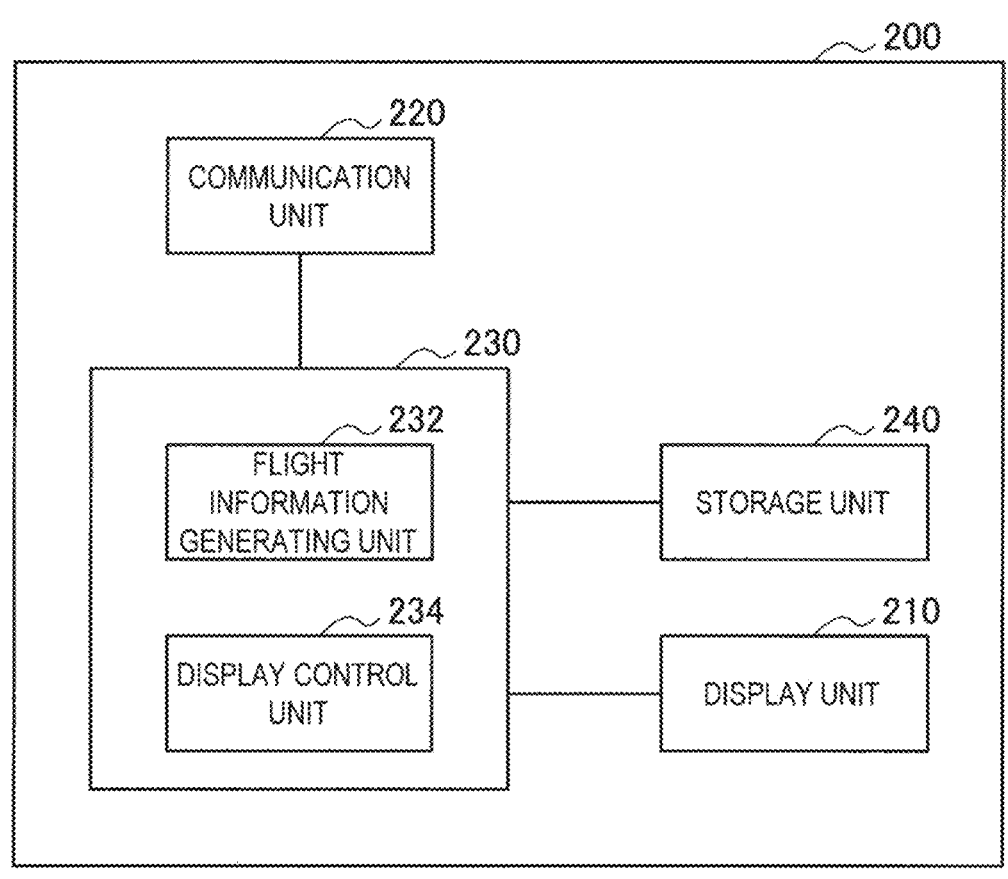
FIG. 4 is an explanatory diagram illustrating an exemplary function configuration of a control terminal 200 according to an embodiment of the present disclosure.

FIG. 4 is an explanatory diagram illustrating an exemplary function configuration of the control terminal 200 according to an embodiment of the present disclosure. An exemplary function configuration of the control terminal 200 according to an embodiment of the present disclosure will be described below with reference to FIG. 4.

As illustrated in FIG. 4, the control terminal 200 according to an embodiment of the present disclosure is configured to include a display unit 210, a communication unit 220, a control unit 230, and a storage unit 240.

The display unit 210 includes a flat display device, for example, a liquid crystal display device, an organic EL display device, or the like. The display unit 210 can display, for example, images captured by the imaging device 101 or information for controlling operations of the hovering camera 100. The display unit 210 is provided with a touch panel, and thus a user can perform a direct operation with respect to the information displayed on the display unit 210 by touching the display unit 210 with his or her finger, or the like.

The communication unit 220 transmits and receives information to/from the hovering camera 100 through wireless communication. The control terminal 200 receives images captured by the imaging device 101 from the hovering camera 100 using the communication unit 220. In addition, the control terminal 200 transmits instructions relating to the flight of the hovering camera 100 to the hovering camera 100 from the communication unit 220. Commands relating to the flight of the hovering camera 100 can be generated by the control unit 230.

The control unit 230 controls an operation of the control terminal 200. For example, the control unit 230 can control a process of displaying text, figures, images, or other information on the display unit 210 and the transmission and reception processes of information to/from other devices (for example, the hovering camera 100) through the communication unit 220. The control unit 230 is configured to include a flight information generating unit 232 and a display control unit 234.

The flight information generating unit 232 generates the flight information to be transmitted to the hovering camera 100. At the time of generation of the flight information, for example, the flight information generating unit 232 uses information related to a structure of an inspection target stored in the storage unit 240 which will be described below. When the flight information is generated, the flight information generating unit 232 causes the generated flight information to be transmitted from the communication unit 220 before takeoff of the hovering camera 100.

The flight information generation process by the flight information generating unit 232 will be described below, but an example of the flight information generation process by the flight information generating unit 232 will be briefly described. The flight information generating unit 232 reads the typical condition diagram of the bridge 1 to be inspected when generating the flight information of the hovering camera 100. The read typical condition diagram of the bridge 1 is displayed on the display unit 210 through the display control unit 234. As described above, points on the typical condition diagram of the bridge 1 are associated with points on the map data including detailed GPS information in advance. The associating is preferably performed by at least two sets of points. The typical condition diagram of the bridge 1 is associated with points on the map data including detailed GPS information in advance, and thus the flight path of the hovering camera 100 is defined using GPS values (a set of a latitude and a longitude).

Then, the flight information generating unit 232 generates the flight path of the hovering camera 100 based on the typical condition diagram of the bridge 1. The flight information generating unit 232 uses information related to a structure such as a construction method, a width, and a span length of the bridge 1, an available flight period of time of the hovering camera 100, and information such as an inspection method of the bridge 1 when generating the flight path of the hovering camera 100. Concrete bridges are classified into reinforced concrete (RC) and prestressed concrete (PC) according to an reinforcement method and are classified into, for example, a RCT girder bridge, a PCT girder bridge, a PC hollow slab bridge, a RC box-girder bridge, a PC box-girder bridge, and the like. Thus, when the construction method of the bridge 1 serving as an inspection target is known, the flight information generating unit 232 can generate a flight path suitable for the construction method of the bridge 1. Then, the flight information generating unit 232 causes the flight path of the hovering camera 100 to be displayed on the typical condition diagram of the bridge 1 in a superimposed manner.

The flight information generating unit 232 defines the flight path of the hovering camera 100 using GPS values (a set of a latitude and a longitude) as described above. As the flight information generating unit 232 defines the flight path of the hovering camera 100 using the GPS value, the hovering camera 100 can determine a position at which the imaging process is executed at the time of flight based on the GPS value.

The display control unit 234 controls the display of text, figures, images, and other information on the display unit 210. Display of text, figures, symbols, images, and other information on the display unit 210 in drawings to be referred to in following descriptions is assumed to be controlled by the display control unit 234. For example, when the flight information generating unit 232 generates the flight information to be transmitted to the hovering camera 100, the display control unit 234 executes control such that the typical condition diagram of the structure (the bridge 1) of the inspection target and the generated flight information are displayed on the display unit 210.

The storage unit 240 stores various types of information. Examples of the information stored in the storage unit 240 include information related to the structure of the inspection target. Examples of the information related to the structure of the inspection target include the typical condition diagram of the structure (the bridge 1) of the inspection target and the construction method of the structure of the inspection target. Further, when a location of the structure of the inspection target which is considered likely to be damaged is known in advance, the information related to the structure of the inspection target may include information of a portion that is considered likely to be damaged.

Further, even when the information related to the structure (the bridge 1) of the inspection target is not stored in the storage unit 240 in advance, the control terminal 200 may receive the information related to the structure of the inspection target, for example, from the information processing device 300 at the time of inspection of the structure.

The control terminal 200 according to an embodiment of the present disclosure has the configuration illustrated in FIG. 4 and can generate the flight information to be transmitted to the hovering camera 100 based on the information related to the structure (the bridge 1) of the inspection target and acquire the image captured based on the flight information by the hovering camera 100 that flies based on the flight information.

The exemplary function configuration of the control terminal 200 according to an embodiment of the present disclosure has been described above with reference to FIG. 4. Next, an exemplary operation of the inspection system 10 according to the embodiment of the present disclosure will be described.

(1.4. Exemplary Operation)

Figure 5:
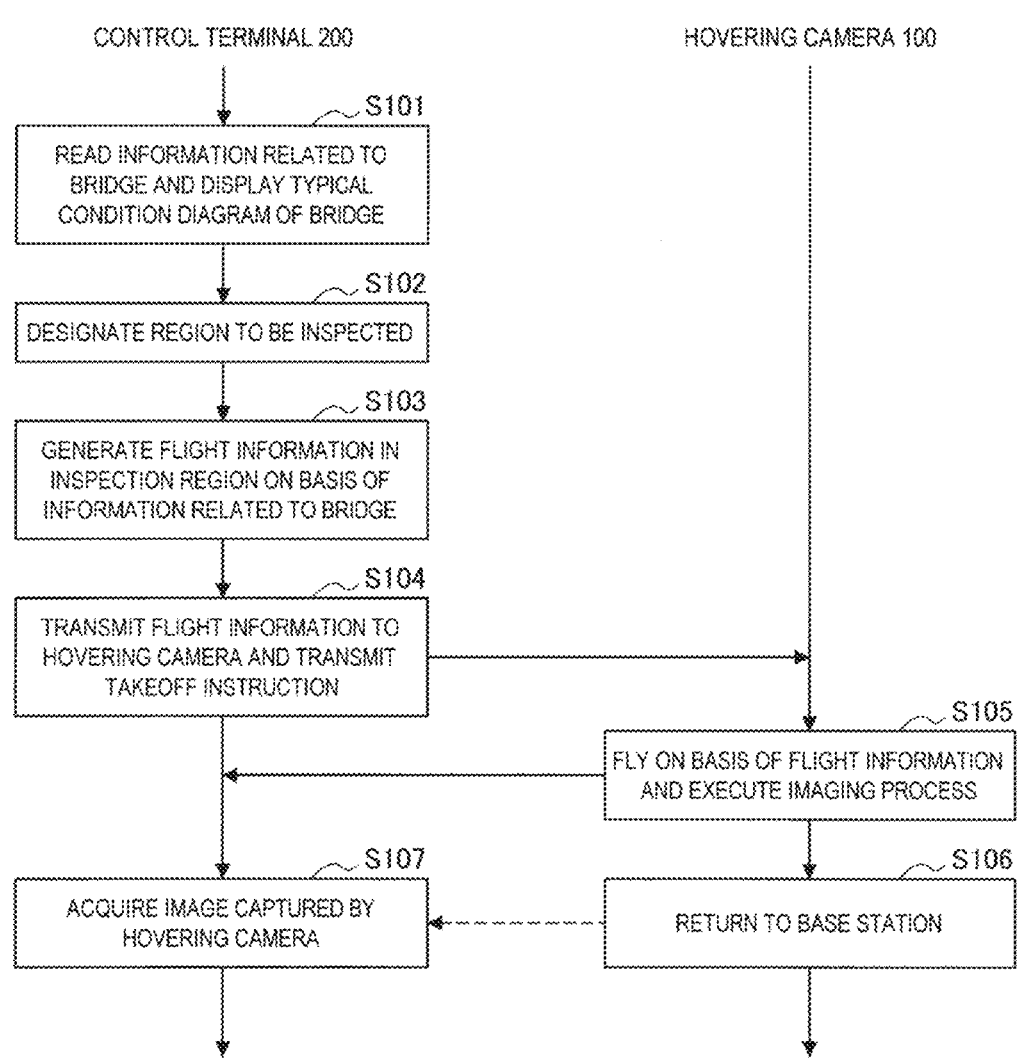
FIG. 5 is a flowchart illustrating an exemplary operation of an inspection system 10 according to an embodiment of the present disclosure.

FIG. 5 is a flowchart illustrating an exemplary operation of the inspection system 10 according to the embodiment of the present disclosure. FIG. 5 illustrates an exemplary operation of the inspection system 10 according to the embodiment of the present disclosure when the bridge 1 is inspected by causing the hovering camera 100 to fly and causing the hovering camera 100 to capture the bridge 1. Further, when the bridge 1 is inspected using the hovering camera 100, the wireless relay node 400 or the position estimation node 500 is assumed to be installed at an appropriate position of the bridge 1 in advance. An exemplary operation of the inspection system 10 according to the embodiment of the present disclosure will be described below with reference to FIG. 5.

The control terminal 200 that generates the flight information of the hovering camera 100 reads information related to the bridge 1 including the typical condition diagram of the bridge 1 (the inspection target), and causes the typical condition diagram of the bridge 1 to be displayed on the display unit 210 (step S101). The reading of the information related to the bridge 1 is executed, for example, by the flight information generating unit 232, and the displaying of the typical condition diagram of the bridge 1 on the display unit 210 is executed, for example, by the display control unit 234. The control terminal 200 in which the typical condition diagram of the bridge 1 is being displayed on the display unit 210 enables the user to designate a region of the bridge 1 to be inspected using the typical condition diagram of the bridge 1 being displayed on the display unit 210 (step S102). The process of enabling the user to designate in step S102 is executed, for example, by the flight information generating unit 232.

For example, when a part of the bridge 1 is set as the inspection target, the control terminal 200 enables the user to designate an inspection target region in the typical condition diagram of the bridge 1 being displayed on the display unit 210. Further, for example, when the entire bridge 1 is set as the inspection target, the control terminal 200 enables the user to designate all regions of the bridge 1 in the typical condition diagram of the bridge 1 being displayed on the display unit 210.

Figure 6:
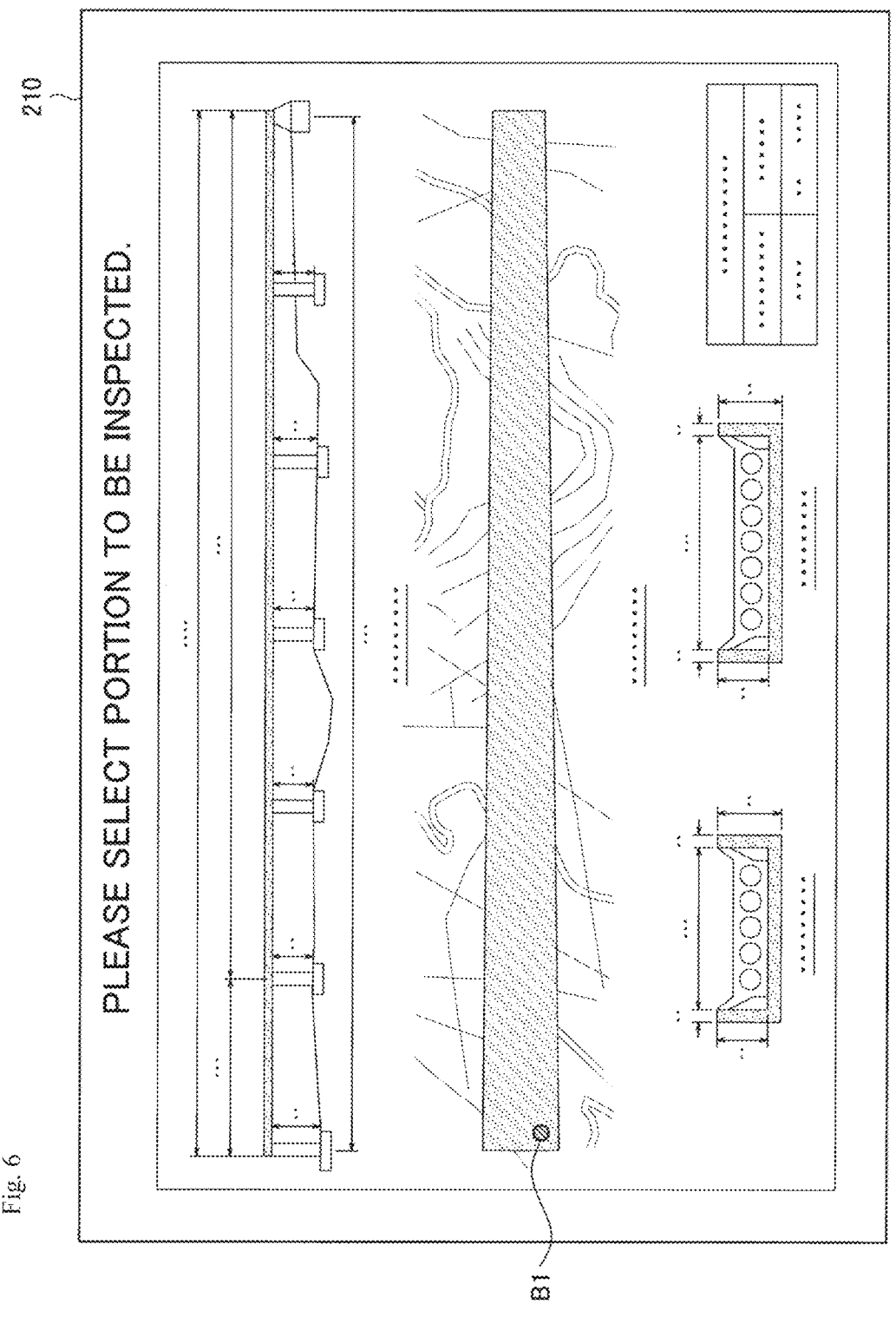
FIG. 6 is an explanatory diagram illustrating an exemplary screen displayed on a display unit 210 of a control terminal 200.

FIG. 6 is an explanatory diagram illustrating an exemplary screen displayed on the display unit 210 of the control terminal 200. FIG. 6 illustrates an exemplary screen displayed on the display unit 210 when the user is requested to designate the region of the bridge 1 to be inspected in step S102. In FIG. 6, a screen displayed on the display unit 210 when the bridge girder is designated as the region of the bridge 1 to be inspected is assumed to be displayed. The control terminal 200 may include, for example, a touch panel as an input unit (not illustrated) and enable the user to designate the region of the bridge 1 by enabling the user to drag on the screen or enabling the user to select the span of the inspection target. Of course, a method of enabling the user to designate the region of the bridge 1 to be inspected is not limited to the relevant example. Further, the displaying of the region designated by the user is not limited to the example illustrated in FIG. 6.

FIG. 6 illustrates an example in which a mark B1 indicating the position of the base station 600 is displayed on the typical condition diagram of the bridge 1 in a superimposed manner. As described above, the base station 600 may include a GPS receiver, and receive the radio waves from the GPS satellites and calculate the current position. Thus, the control terminal 200 can cause the mark B1 indicating the position of the base station 600 to be displayed on the typical condition diagram of the bridge 1 in a superimposed manner based on the information of the current position calculated by the base station 600.

When the region of the bridge 1 to be inspected is designated by the user, the control terminal 200 then generates the flight information of the hovering camera 100 in the inspection region designated by the user based on the information related to the bridge 1 (step S103). The flight information generation process in step S103 is executed, for example, by the flight information generating unit 232.

The control terminal 200 uses information related to a structure such as a construction method, a width, and a span length of the bridge 1, an available flight period of time of the hovering camera 100, and information such as an inspection method of the bridge 1 when generating the flight information of the hovering camera 100 in step S103. For example, when a T girder is used in the construction method of the bridge 1, the control terminal 200 generates a flight path in which the hovering camera 100 repeats levitation and descending at the bottom side of the bridge 1 as the flight information. Further, the control terminal 200 may use information of an image target surface of the bridge 1 when generating the flight information of the hovering camera 100 in step S103. For example, when the user selects capturing of the side of the bridge 1, the control terminal 200, the control terminal 200 generates a flight path along the side of the bridge 1 as the flight information, and when the user selects capturing of the bottom surface of the bridge 1, the control terminal 200 generates a flight path in which it travels back and forth under the bottom side of the bridge 1 as the flight information.

An example of the flight information generated by the control terminal 200 will be described. As the flight information, for example, a list of positions at which the imaging process is executed may be designated in the following format:

ID: (relative coordinates of imaging point, imaging direction, speed at time of imaging, traveling time to next imaging point, and others)

The relative coordinates of an imaging point are designated by three points of an X axis, a Y axis, and a Z axis. The X axis is set as a latitude direction, the Y axis is set as a longitude direction, and the Z axis is set as a height direction. Further, for example, information used to control special capturing may be included as other information. Examples of the information used to control special capturing include information for capturing the same position in a plurality of imaging directions, information related to a parameter for bracket capturing (which indicates capturing by different exposures, different shutter speeds, different ISO sensitivities, and the like at the same position and in the same imaging direction), and information on a wavelength of infrared rays at the time of capturing. According to this format, the flight information generated by the control terminal 200 can be configured with the following list of following various values:

0:(0,0,0,0,0,2,1.0)
1:(5,0,0,0,0,2,1.0)
2:(7,0,0,0,0,2,1.0)
3:(9,0,0,0,0,2,1.0)

The imaging point included in the flight information generated by the control terminal 200 may be designated, for example, relative coordinates from a reference point by using absolute coordinates of the base station 600 or absolute coordinates of an arbitrary position such as a first imaging position as the reference point. The hovering camera 100 may convert the relative coordinates from the absolute coordinates of the reference point into the absolute coordinates and refer to the converted coordinates at the time of flight. Further, the imaging point included in the flight information generated by the control terminal 200 may be designated by the absolute coordinates instead of the relative coordinates. Furthermore, a certain value may be stored in the information used to control special capturing included in the flight information generated by the control terminal 200. For example, a value such as 1: capturing in a plurality of imaging directions), 2: bracket capturing (a change in a shutter speed), 3: bracket capturing (a change in ISO sensitivity), or the like may be stored in the information used to control special capturing. The control terminal 200 may cause the information used to control special capturing to be included in the flight information, for example, for a location of the bridge girder 3 which is considered likely to be damaged and stored in the storage unit 240.

The control terminal 200 may generate the flight information for causing the hovering camera 100 to capture, for example, the back surface of the bridge girder 3 of the bridge 1 at equal intervals at the time of the flight information generation process of step S103. Thus, the control terminal 200 may generate the flight information so that the imaging positions of the still images are equal intervals at the time of the flight information generation process of step S103.

When information of a portion considered likely to be damaged is stored in the storage unit 140 in advance, the control terminal 200 may read the stored information and generate the flight information so that the portion is captured in detail by the hovering camera 100 when generating the flight information of the hovering camera 100 in step S103. When a portion considered likely to be damaged is captured by the hovering camera 100, the control terminal 200 may cause the information used to control special capturing to be included in the flight information. Of course, information of a portion considered likely to be damaged may not be stored in the storage unit 140 in advance, and in this case, information of a portion considered likely to be damaged may be input by the user at the time of inspection.

When the hovering camera 100 is caused to fly over the region of the bridge 1 to be inspected, a case in which it is difficult to cause the hovering camera 100 to fly over the region once according to the available flight period of time of the hovering camera 100 is considered. The available flight period of time of the hovering camera 100 may be obtained based on the capacity of the battery 150, power consumption of the motors 108*a* to 108*d* for driving the rotors 104*a* to 104*d*, power consumption of the imaging device 101, the control unit 110, and the communication unit 120, or the like in advance. Further, when the flight information is generated, it is also possible to estimate a period of time necessary for a single inspection flight of the hovering camera 100 based on a scheduled traveling time from a start position (for example, the base station 600) to a first imaging point, a scheduled traveling time between the imaging points, a scheduled traveling time from a last imaging point to the start position, and the like. Thus, when the hovering camera 100 is unable to fly along the entire flight path for the region of the bridge 1 to be inspected during a single inspection flight, the control terminal 200 may divide the generated flight path into several paths.

Figure 7:
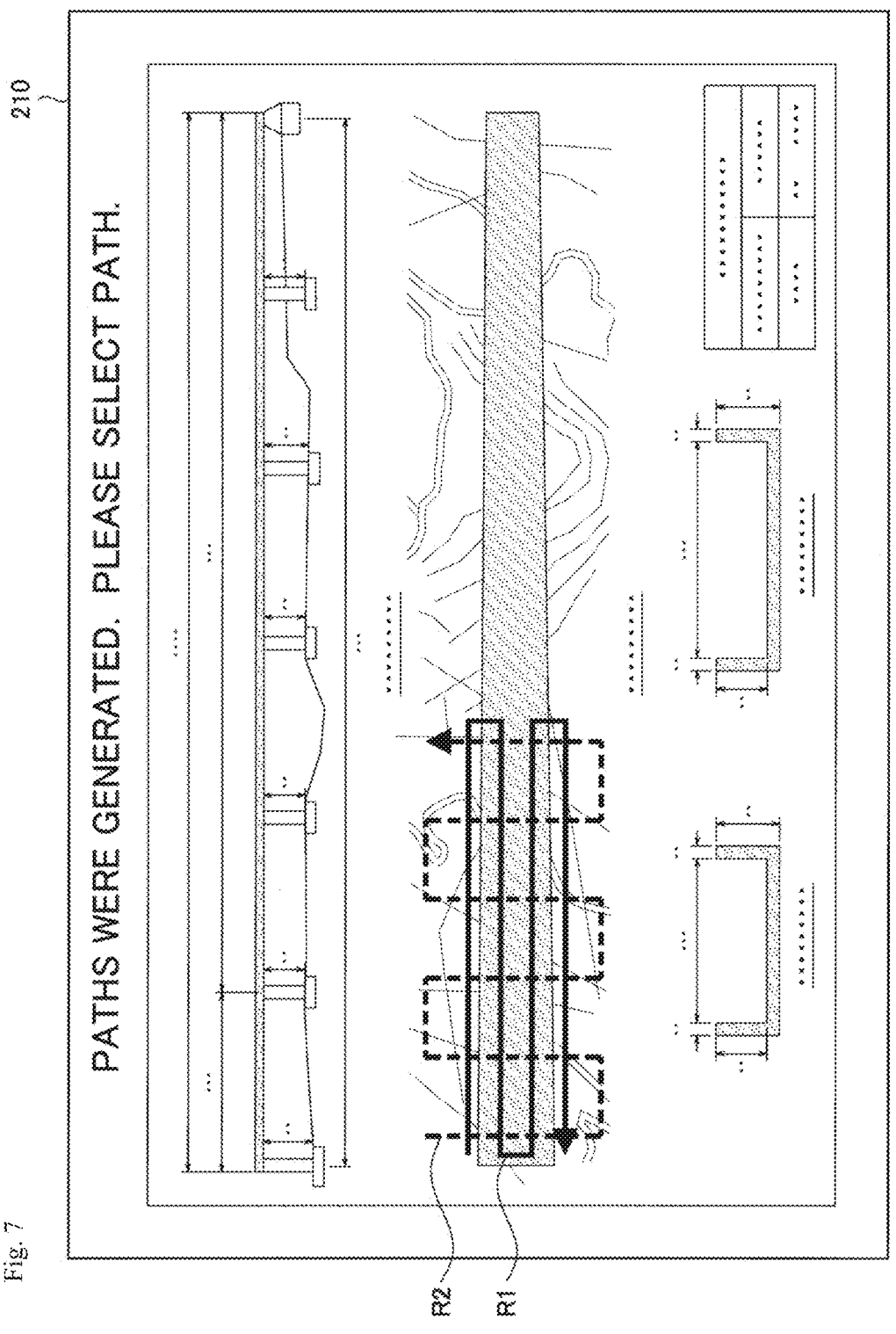
FIG. 7 is an explanatory diagram illustrating an exemplary screen displayed on a display unit 210 of a control terminal 200.

Further, the control terminal 200 may generate a plurality of flight paths and cause the plurality of flight paths to be displayed on the display unit 210 when generating the flight information of the hovering camera 100 in step S103. FIG. 7 is an explanatory diagram illustrating an exemplary screen displayed on the display unit 210 of the control terminal 200.

FIG. 7 illustrates an example of a state in which a plurality of flight paths are generated, and then flight paths R1 and R2 are displayed on the display unit 210 when the flight information of the hovering camera 100 is generated in S103. The control terminal 200 causes a plurality of flight paths to be displayed on the display unit 210 and enables the user to select one flight path. The control terminal 200 generates the flight information based on the flight path selected by the user.

When the flight information of the hovering camera 100 is generated in step S103, the control terminal 200 then transmits the generated flight information to the hovering camera 100, and transmits a takeoff instruction to the hovering camera 100 (step S104). The transmitting of the generated flight information and the transmitting of the takeoff instruction are performed, for example, by the flight information generating unit 232 through the communication unit 220.

Figure 8:
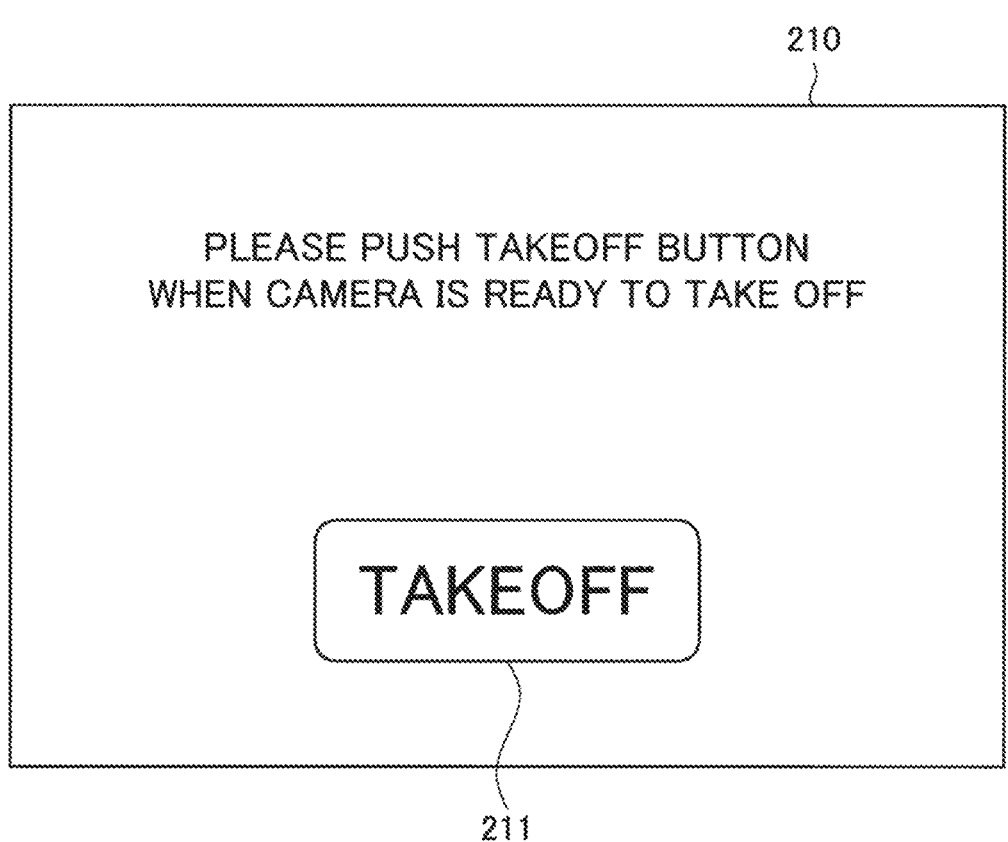
FIG. 8 is an explanatory diagram illustrating an exemplary screen displayed on a display unit 210 of a control terminal 200.

FIG. 8 is an explanatory diagram illustrating an exemplary screen displayed on the display unit 210 of the control terminal 200. FIG. 8 an exemplary screen displayed on the display unit 210 of the control terminal 200 when the takeoff instruction is transmitted to the hovering camera 100. The user can cause the takeoff instruction to be transmitted from the control terminal 200 to the hovering camera 100 by touching a takeoff instruction button 211 displayed on the display unit 210. Further, when the takeoff instruction is transmitted from the control terminal 200 to the hovering camera 100, the flight information generated in step S103 may be transmitted from the control terminal 200 to the hovering camera 100 before the takeoff instruction is transmitted, but the flight information generated in step S103 may be transmitted from the control terminal 200 to the hovering camera 100 after the takeoff instruction is transmitted from the control terminal 200 to the hovering camera 100.

The hovering camera 100 that has received the flight information and the takeoff instruction from the control terminal 200 and then taken off from the base station 600 flies based on the flight information transmitted from the control terminal 200, performs the imaging process, and obtains a still image (step S105). The hovering camera 100 acquires position information when the imaging process of acquiring a still image is executed or fuselage information at the time of the imaging process, and associates the acquired information with the still image. For example, information such as a yaw angle, a pitch angle, acceleration, or an angular velocity may be included in the fuselage information at the time of the imaging process. Further, the hovering camera 100 may transmit a moving image being captured by the imaging device 101 during flight to the control terminal 200 in a streaming manner. As the control terminal 200 acquires and displays the moving image being captured through the imaging device during flight by the hovering camera 100, the control terminal 200 can present a position at which the hovering camera 100 is flying to the user.

Preferably, the hovering camera 100 maintains constant a distance from the image target surface (for example, the side surface or the bottom surface of the bridge girder 3) at all the imaging points when executing the imaging process. As the distance from the image target surface is maintained constant at all the imaging points, the hovering camera 100 can obtain still images captured with the same size. When a portion considered likely to be damaged is included in the flight path of the hovering camera 100, the hovering camera 100 may change the imaging direction of the imaging device, use infrared rays having different wavelengths, or change a shutter speed for the portion and then capture a plurality of still images. Further, when a portion considered likely to be damaged is included in the flight path of the hovering camera 100, the hovering camera 100 may narrow an interval of positions at which the imaging process of the portion is performed so as to be smaller than that of other portions.

Figure 9:
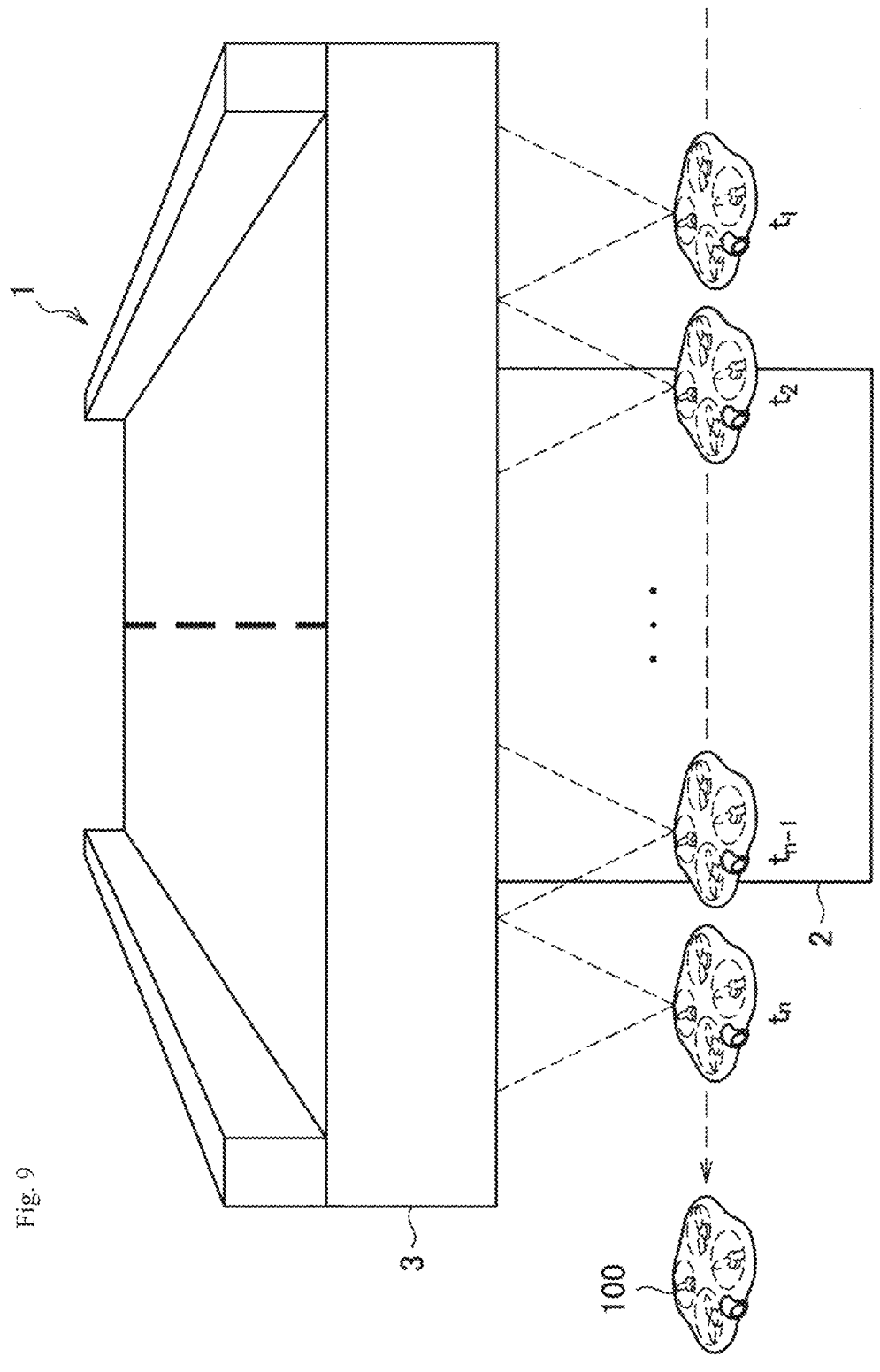
FIG. 9 is an explanatory diagram conceptually illustrating an example of capturing of a bottom surface of a bridge 1 by a hovering camera 100.

FIG. 9 is an explanatory diagram conceptually illustrating an operation of the hovering camera 100 in the inspection system 10 according to the embodiment of the present disclosure. When the hovering camera 100 flies under the bottom side of the bridge 1 based on the flight information, for example, the hovering camera 100 stops at a time $t_1$ and captures the bottom surface of the bridge 1, flies to and stops at a position at which capturing is to be performed at a time $t_2$ after the imaging, captures the bottom surface of the bridge 1 at a different position at the time $t_2$ and then repeats flying, stopping, and capturing up to a time $t_n$. As the hovering camera 100 repeats flying, stopping, and capturing, the images of the bottom surface of the bridge 1 are obtained.

When the hovering camera 100 flies based on the flight information, it is possible to detect the current position accurately when it is possible to receive the radio waves from the GPS satellites without interference. However, it is difficult for the hovering camera 100 to detect the current position accurately at a position at which it is difficult to receive the radio waves from the GPS satellites such as a position under the bridge 1. In this regard, in the present embodiment, the position estimation node 500 is used, and thus the hovering camera 100 detects the current position accurately at a position at which it is difficult to receive the radio waves from the GPS satellites.

Figure 10:
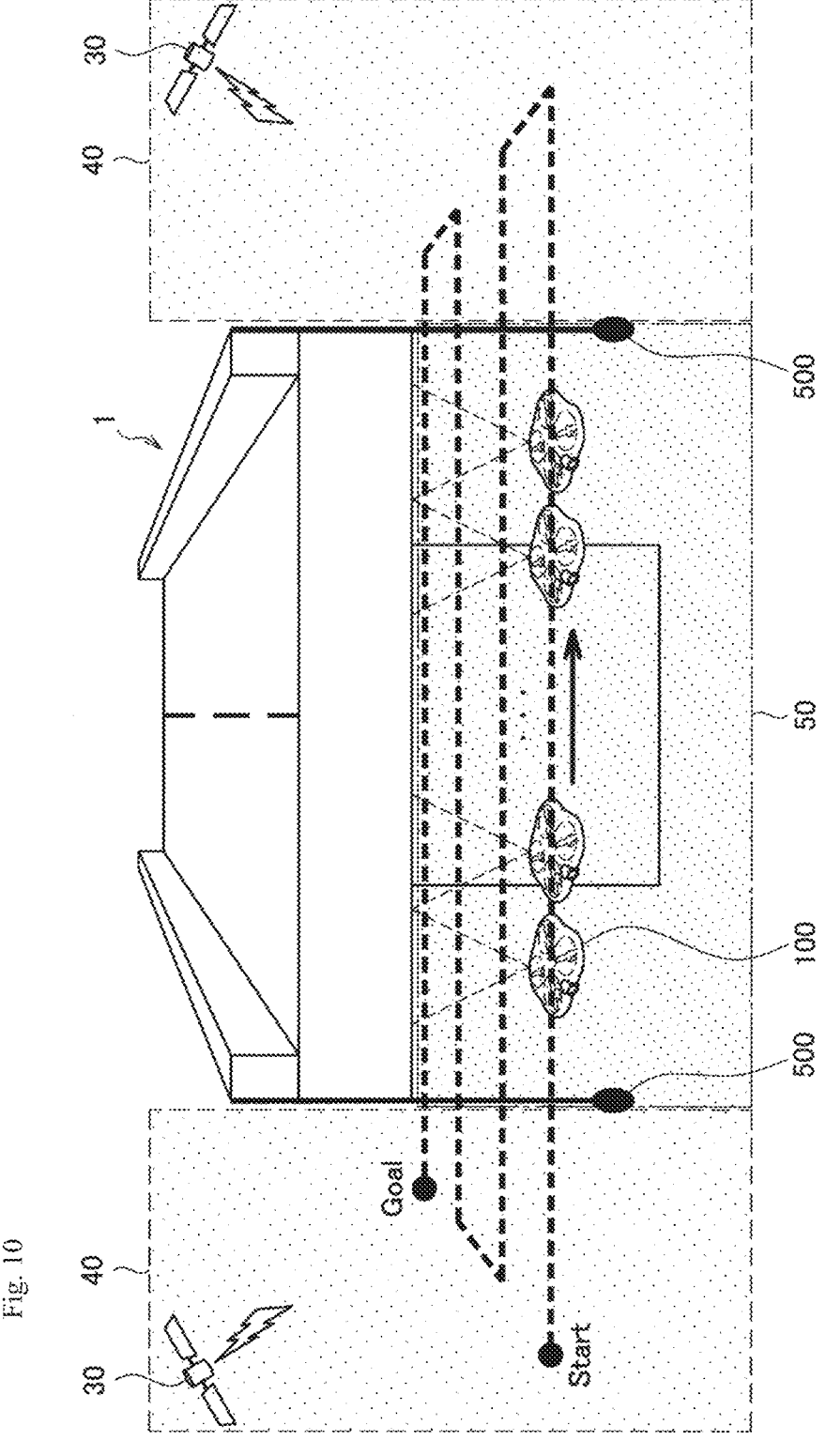
FIG. 10 is an explanatory diagram conceptually illustrating an operation of a hovering camera 100 in an inspection system 10 according to an embodiment of the present disclosure.

FIG. 10 is an explanatory diagram conceptually illustrating an operation of the hovering camera 100 in the inspection system 10 according to the embodiment of the present disclosure. For example, when an interval from Start to Goal in FIG. 10 is set as a path along which the hovering camera 100 flies, the hovering camera 100 receives the radio waves from the GPS satellites 30 without interference, and moves back and forth in a GPS position measurement area 40 in which position measurement is performed and a sensor position measurement area 50 in which the current position is estimated, for example, using a vision sensor.

In the GPS position measurement area 40, the hovering camera 100 detects the current position using the radio waves received from the GPS satellites 30. In the sensor position measurement area 50, the hovering camera 100 detects the position between the position estimation nodes 500, that is, the current position based on the integration value of the sensors (for example, the IMU sensor) installed in the hovering camera 100 and the distance to the position estimation node 500 of the movement destination calculated from the image captured by the imaging device 101 when the position estimation node 500 is the AR marker. When the position estimation node 500 is the GPS signal transmitter, the hovering camera 100 detects the current position using a signal transmitted from the position estimation node 500.

Using the position estimation node 500 as described above, the hovering camera 100 can detect the accurate current position even when the hovering camera 100 moves to the position at which the radio waves from the GPS satellites are hardly received.

When the imaging process at the last imaging point is completed, the hovering camera 100 automatically flies to the base station 600 in order to return to the base station 600 (step S106). Then, the control terminal 200 acquires the image captured by the hovering camera 100 that has returned to the base station 600 from the hovering camera 100 (step S107). The acquiring of the image captured by the hovering camera 100 may be performed after the hovering camera 100 returns to the base station 600 as described above, but the control terminal 200 may acquire a still image sequentially each time the hovering camera 100 executes the imaging process and acquires the still image.

As the hovering camera 100 and the control terminal 200 execute the above operation illustrated in FIG. 5, the inspection system 10 according to an embodiment of the present disclosure can generate the flight information to be transmitted to the hovering camera 100 based on the information related to the structure (the bridge 1) of the inspection target through the control terminal 200, capture an image based on the flight information through the hovering camera 100 that flies based on the flight information, and acquire the image captured by the hovering camera 100 through the control terminal 200.

Further, the user is assumed to have found a portion that is desired to be captured in detail after viewing a moving image captured by the hovering camera 100 while the hovering camera 100 is flying. In this case, for example, the user may operate the control terminal 200 to stop the automatic flight of the hovering camera 100 and cause an instruction to switch to a manual operation to be transmitted from the control terminal 200.

The above example has been described in connection with the process in which the flight information is generated through the control terminal 200, the hovering camera 100 performs an automatic flight based on the generated flight information and executes the imaging process. However, a case in which an obstacle not found on the typical condition diagram of the bridge 1 is present in the flight path is also considered.

Figure 11:
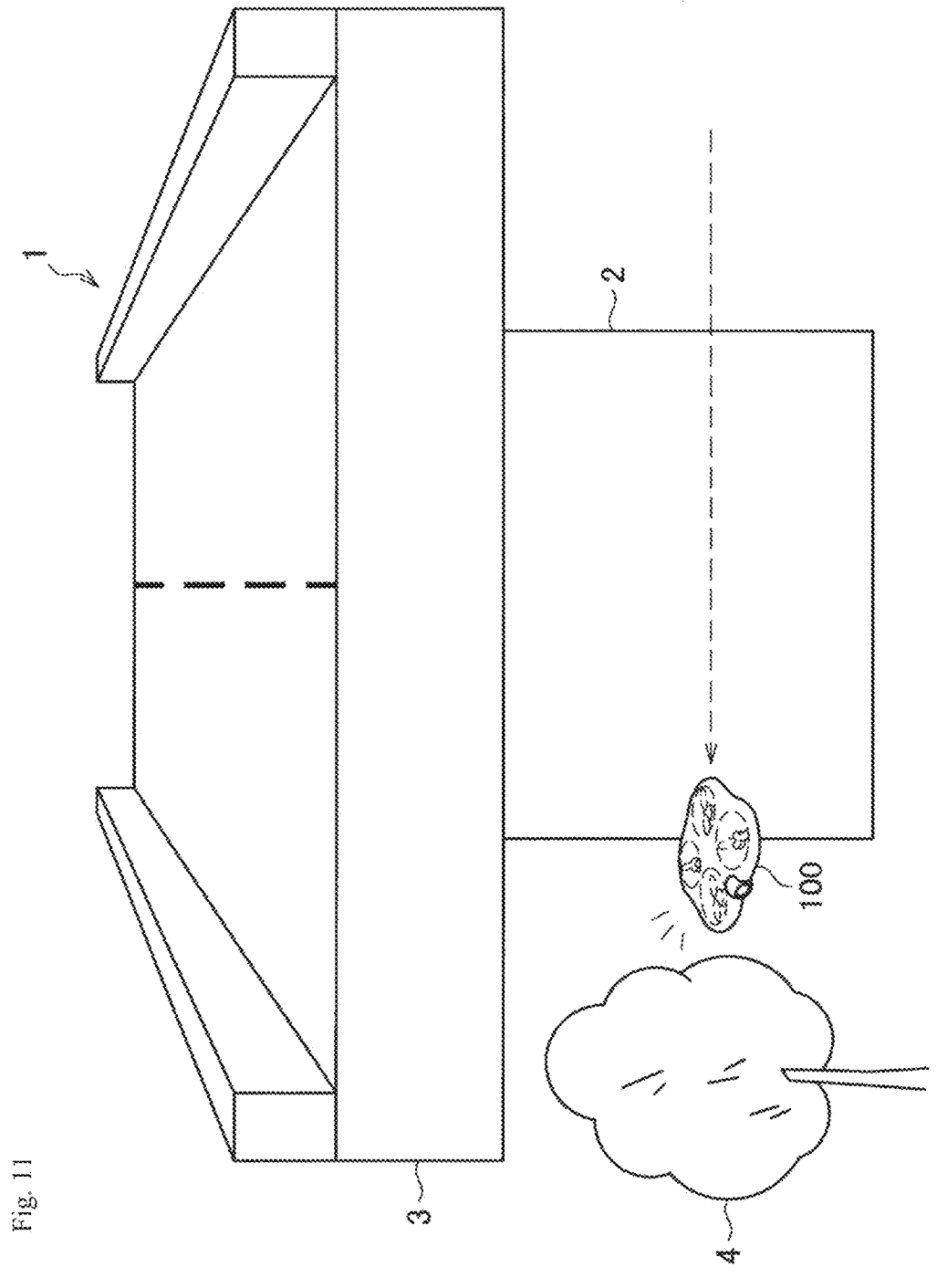
FIG. 11 is an explanatory diagram conceptually illustrating an operation of a hovering camera 100 in an inspection system 10 according to an embodiment of the present disclosure.

FIG. 11 is an explanatory diagram conceptually illustrating an operation of the hovering camera 100 in the inspection system 10 according to the embodiment of the present disclosure. FIG. 11 illustrates an example in which a tree 4 is under the bridge girder 3. The tree 4 is an obstacle that is not shown on the typical condition diagram of the bridge 1, and there are cases in which the presence of the tree is found at the time of flight of the hovering camera 100 for the first time.

Thus, in the present embodiment, it may be checked whether or not there is an obstacle in the flight path included in the flight information by causing the hovering camera 100 to perform a test flight once based on the flight information generated by the control terminal 200.

When the hovering camera 100 is caused to perform a test flight once based on the flight information generated by the control terminal 200, the control terminal 200 may receive a moving image being captured by the hovering camera 100 in a streaming manner, and the user may check whether or not there is an obstacle in the flight path included in the flight information while viewing the moving image. An obstacle may be detected through the sensor unit 130 of the hovering camera 100. A detailed position of an obstacle can be detected when a stereo camera is installed as the imaging device 101 of the hovering camera 100, and a distance to an obstacle is detected by capturing performed by the stereo camera, or a direction of an obstacle is specified according to a direction of the hovering camera 100. Further, when the hovering camera 100 is caused to perform a test flight, when there is an obstacle in the flight path, the hovering camera 100 may stop an automatic flight, move in a hovering state, and may be on standby for an operation from the user or may return to the base station 600 automatically.

When it is found that there is an obstacle in the flight path included in the flight information, the control terminal 200 may register a location of the obstacle in the typical condition diagram of the bridge 1. The location of the obstacle may be manually input by the user, and when the hovering camera 100 detects an obstacle through the sensor unit 130, the detected location of the obstacle may be acquired from the hovering camera 100, and then the location of the obstacle may be registered in the typical condition diagram of the bridge 1.

Figure 12:
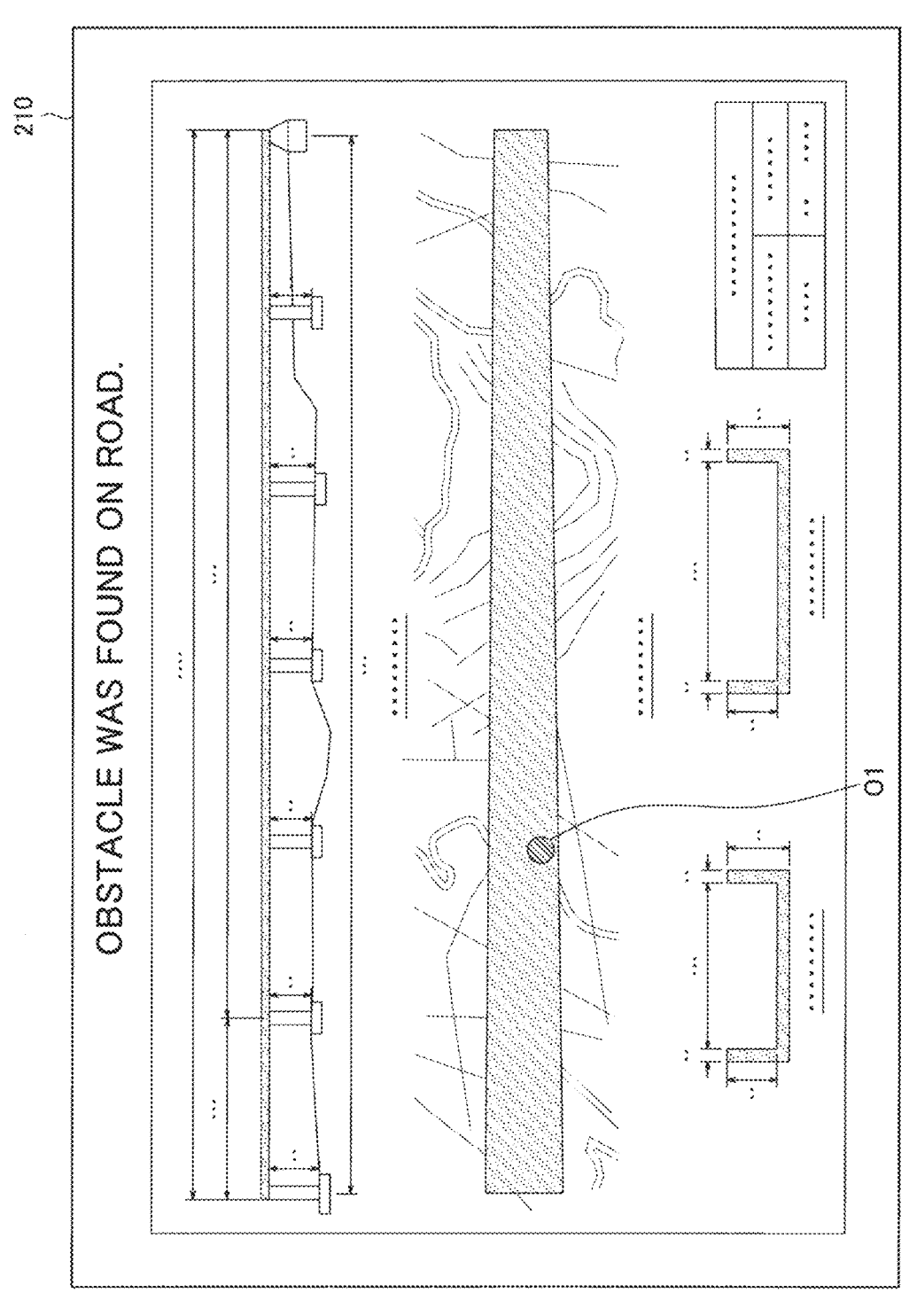
FIG. 12 is an explanatory diagram illustrating an exemplary screen displayed on a display unit 210 of a control terminal 200.

FIG. 12 is an explanatory diagram illustrating an exemplary screen displayed on the display unit 210 of the control terminal 200. FIG. 12 is an exemplary screen displayed on the display unit 210 when it is found that there is an obstacle in the flight path through the test flight of the hovering camera 100. When it is found that there is an obstacle in the flight path through the test flight of the hovering camera 100, the control terminal 200 causes a mark O1 indicating the location of the obstacle to be displayed on the typical condition diagram of the bridge 1 in a superimposed manner.

When the location of the obstacle is known, the control terminal 200 regenerates flight information including a flight path avoiding the location of the obstacle, and transmits the generated flight information to the hovering camera 100. The hovering camera 100 flies based on the flight information regenerated by the control terminal 200 and thus perform the flight and the imaging process while avoiding the obstacle (the tree 4).

A method of causing the hovering camera 100 to fly and detecting the location of the obstacle is not limited to the relevant example. For example, the hovering camera 100 may be caused to fly along an outer circumference of the flight path generated by the control terminal 200 through a simple path while capturing a moving image through the imaging device 101, and it may be checked whether or not there is an obstacle under the bridge girder 3.

(1.5. Exemplary Damage Data Generation)

For example, a location which is not easily accessible such as the bottom surface of the bridge girder 3 can be detected by causing the hovering camera 100 to fly and capture the bridge 1. The still image captured by the hovering camera 100 is associated with, for example, the position information (which may include position information obtained by position measurement using the GPS or position measurement using the position estimation node 500) of the hovering camera 100 that has captured the still image, the fuselage information (for example, a yaw angle, a pitch angle, acceleration, and an angular velocity) at the time of capturing, and information of the imaging direction. Further, as the hovering camera 100 performs the capturing at all the imaging points while maintaining the distance from the image target surface constant, a relative position of a location at which damage is occurring in an image is detected. Thus, when the still image captured by the hovering camera 100 includes a damaged portion of the bridge girder 3, it is possible to detect an absolute location of the damaged portion. For example, position information of a damaged portion is obtained by setting a center of a still image as a point of origin, calculating a relative value of a damaged portion, and calculating the relative value of the position information of the hovering camera 100 when the image is captured. For example, the following data may be recorded as position information of a damaged portion.

(1) The information of the imaging position of the still image is recorded as the position of the damaged portion (a relative value (offset) is not recorded).

(2) The relative value (offset) corresponding to the information of the imaging position of the still image and damaged portion is recorded as the position of the damaged portion.

(3) The absolute value used as a reference (for example, as will be described below, the imaging position of the still images of four corners considered to be highly accurate in position information, or coordinates of the position estimation node 500) and the relative value (offset) are recorded as the position of the damaged portion.

(4) The calculated absolute value (for example, a latitude, a longitude, and an altitude) is recorded as the position of the damaged portion.

A technique of obtaining a physical size of an imaging range using a numerical value such as a focal distance of a lens, a size of an image sensor, a distance to an imaging target, or the like is known. Thus, when a damaged portion is detected, the physical size of the imaging range of the hovering camera 100 may be estimated using distance information from the hovering camera 100 to the imaging target (for example, the back surface or the side surface of the bridge girder 3) or angle of view information of the imaging device 101. Physical position information of a damaged portion is determined by setting a central position (a position at which the hovering camera 100 performs capturing) of a captured image as a point of origin, estimating a physical relative position from the point of origin to the damaged portion, and adding position coordinates of the point of origin of the captured image to the relative position. Further, when the distance information and the angle of view information may be acquired through the sensors installed in the hovering camera 100 at the time of capturing, information recorded in association with the image may be used, and a value set for the hovering camera 100 or the imaging device 101 may be used. Further, the position information of the damaged portion may be calculated using the fuselage information (for example, a yaw angle, a pitch angle, acceleration, and an angular velocity) at the time of capturing and the information of the imaging direction rather than the imaging position information, the distance information, and the angle of view information.

The detecting of the damaged portion based on the still image captured by the hovering camera 100 may be visually performed by the user but may be automatically performed through imaging processing, for example, by the information processing device 300. When the detecting of the damaged portion is automatically performed, for example, an image processing technique such as a pattern matching may be used.

A data configuration of damage data is defined, for example, in the following format: (image ID, damage ID, position information of damaged portion, coordinates of damaged portion on image, damage type ID, damage degree)

The damage type ID refers to an ID allocated to a type of damage such as a crack, peeling, a water leak, or free lime. Further, a maximum width of data, a length of a damaged portion in an image, or the like may be recorded in the damage degree field. The inspection system 10 according to the present embodiment can generate damage data according to the above format from the still image captured by the hovering camera 100 through a manual input of the user or an automatic process by the information processing device 300. Further, the damage data generated by the inspection system 10 according to the present embodiment may be used for a process of placing an order to a construction contractor who repairs the damage occurring in the bridge 1.

However, the hovering camera 100 captures a number of still images during a single inspection flight. Thus, checking the still images captured by the hovering camera 100 during an inspection flight one by one increases a burden on the user.

In this regard, one image is obtained by stitching the still images captured by the hovering camera 100. As the still images captured by the hovering camera 100 are stitched, for example, an appearance of the bottom surface of the bridge girder 3 corresponding to one span is obtained as one image. Then, by checking the image of the bottom surface of the bridge girder 3 corresponding to one span obtained by stitching the still images captured by the hovering camera 100, the user can check whether there is damage to the bottom surface of the bridge girder 3. The still image stitching process may be performed by the control terminal 200 or may be performed by the information processing device 300.

Figure 13:
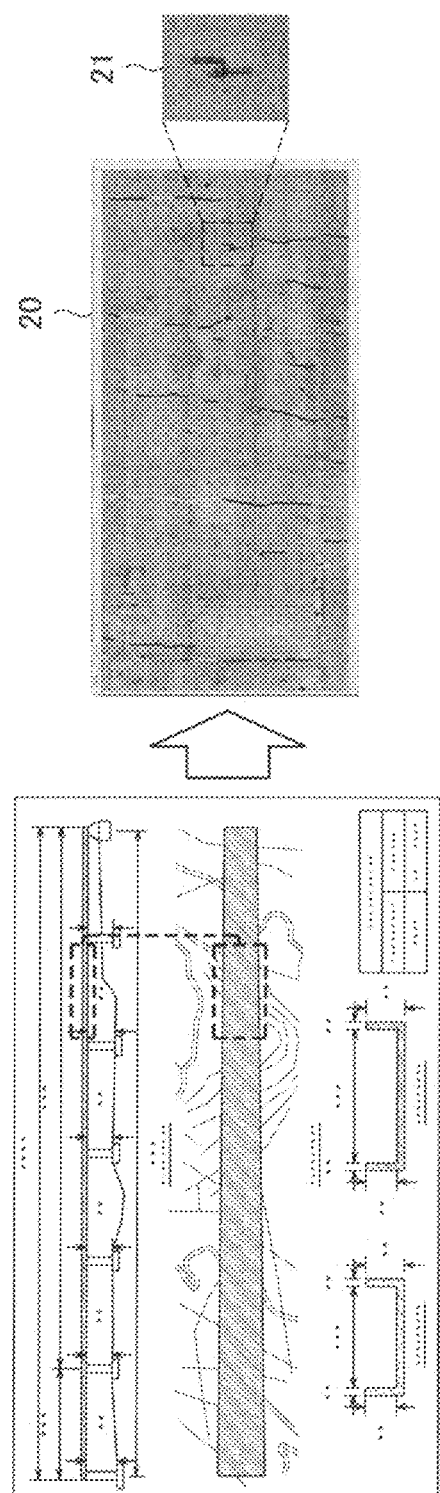
FIG. 13 is an explanatory diagram illustrating an overview when a bottom surface of a bridge girder 3 is inspected.

FIG. 13 is an explanatory diagram illustrating an overview when the bottom surface of the bridge girder 3 is inspected based on the still images captured by the hovering camera 100. One image 20 obtained by capturing the bottom surface of the bridge girder 3 is obtained by capturing a certain portion of the bottom surface of the bridge girder 3 (for example, a portion of the bridge girder 3 corresponding to one span length) and stitching the still images captured by the hovering camera 100. A reference numeral 21 indicates an image captured in a single imaging process of the hovering camera 100.

When an absolute location of a damaged portion is obtained based on the image obtained by stitching the still images captured by the hovering camera 100, position information that is relatively highly accurate position information at the time of capturing in the stitched image can be selected as a reference point. The position information of the hovering camera 100 of the still images of four corners serving as the basis of the stitched image at the time of capturing may be used as the reference point. The still images of four corners serving as the basis of the stitched image have the smallest distortion, the GPS position measurement area has a small error in position information, and it is considered desirable to use position information of four corners that is in a GPS position measurement area and close to the GPS position measurement area at the time of capturing as the reference point, and thus it is possible to obtain the position of the damaged portion more accurately by obtaining the absolute location of the damaged portion from the position information of the hovering camera 100 corresponding to the still images of the four corners. Further, for example, position measurement status information (information indicating a state in which 2D position measurement is being performed, a state in which 3D position measurement is being performed, an position measurement disable state or data such as the number of reception satellites) in GPS position measurement data may be used as the accuracy of position information.

Figure 14:
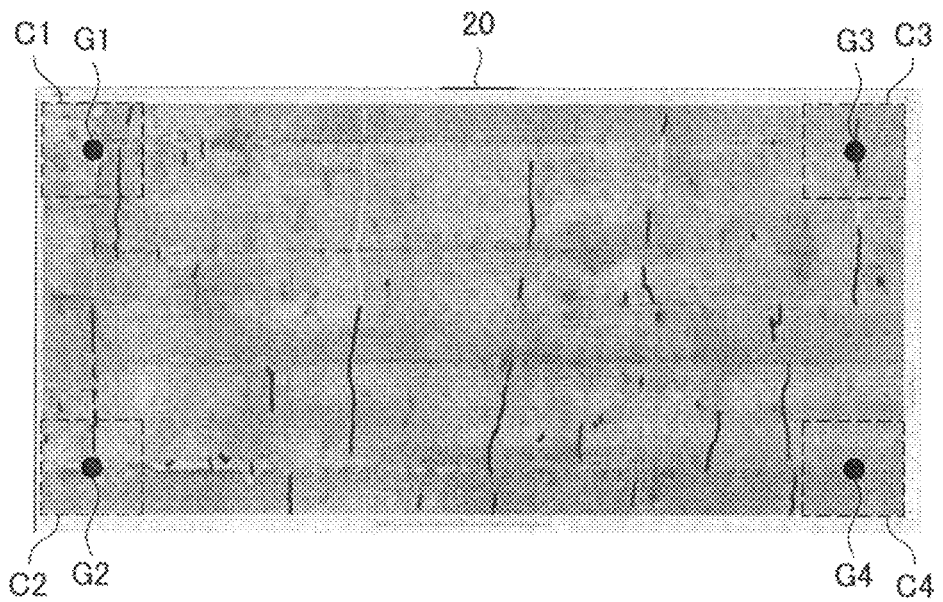
FIG. 14 is an explanatory diagram illustrating an example of an image 20 obtained by stitching still images captured by a hovering camera 100.

FIG. 14 is an explanatory diagram illustrating an example of the image 20 obtained by stitching the still images captured by the hovering camera 100. Each of centers G1 to G4 of the still images C1 to C4 of four corners serving as the basis of the image 20 corresponds to the position of the hovering camera 100 when each still image is captured. In the present embodiment, the absolute position of the damaged portion in the image 20 is calculated using the position information of the hovering camera 100 corresponding to the still images C1 to C4 of the four corners.

When the damage data is generated from the stitched image, a data configuration of the damage data is defined, for example, in the following format. In other words, an image ID is deleted from the damage data.

(damage ID, position information of damaged portion, coordinates of damaged portion on image, damage type ID, damage degree)

Further, the image ID of the stitched image may be generated and included in the damage data. The inspection system 10 according to the present embodiment can generate the damage data according to the above format from the stitched image through the manual input of the user or an automatic process by the information processing device 300.

(1.5.1. Exemplary Function Configuration)

Figure 15:
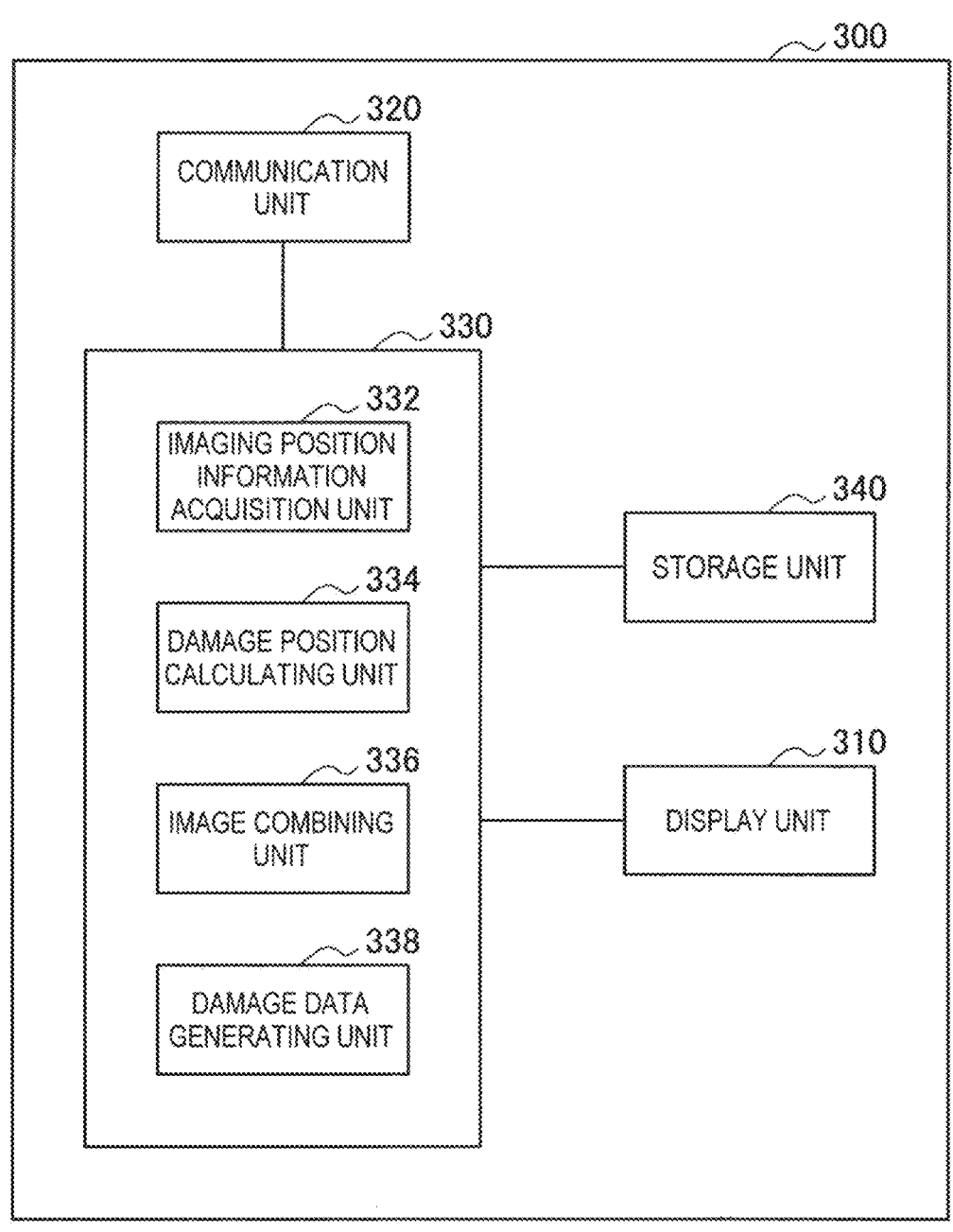
FIG. 15 is an explanatory diagram illustrating an exemplary function configuration of an information processing device 300 according to an embodiment of the present disclosure.

FIG. 15 is an explanatory diagram illustrating an exemplary function configuration of the information processing device 300 according to an embodiment of the present disclosure. FIG. 15 illustrates an exemplary function configuration of the information processing device 300 according to an embodiment of the present disclosure which has a function of obtaining the absolute position of damage of the bridge girder 3 from the still image captured by the hovering camera 100 and generating the damage data. An exemplary function configuration of the information processing device 300 according to an embodiment of the present disclosure will be described below with reference to FIG. 15.

As illustrated in FIG. 15, the information processing device 300 according to an embodiment of the present disclosure includes a display unit 310, a communication unit 320, a control unit 330, and a storage unit 340.

For example, the display unit 310 is configured with a flat panel display device such as a liquid crystal display (LCD) device or an organic EL display device. For example, the display unit 310 may display an image captured by the imaging device 101 of the hovering camera 100, information related to damage of the bridge 1 obtained by the image captured by the imaging device 101, and the like.

For example, the communication unit 320 performs transmission and reception of information to/from the control terminal 200 through wireless communication. The information processing device 300 receives the image captured by the hovering camera 100 from the control terminal 200 through the communication unit 320 together with information of an absolute imaging position of the image.

The control unit 330 controls an operation of the information processing device 300. For example, the control unit 330 can control a process of displaying text, figures, images, or other information on the display unit 210 and the transmission and reception processes of information to/from other devices (for example, the control terminal 200) through the communication unit 320. The control unit 330 includes an imaging position information acquisition unit 332, a damage position calculating unit 334, an image combining unit 336, and a damage data generating unit 338.

The imaging position information acquisition unit 332 acquires information of the imaging position at the time of capturing which is acquired by the hovering camera 100 when the hovering camera 100 captures the bridge 1. The damage position calculating unit 334 detects the damaged portion of the bridge 1 from the image captured by the hovering camera 100, for example, using an image processing technique such as pattern matching, and calculates the absolute position of the damaged portion using the information of the imaging position acquired by the imaging position information acquisition unit 332.

The image combining unit 336 performs the image process of stitching the still images captured by the hovering camera 100 and generating one image. The image combining unit 336 may use the information of the imaging positions of the still images at the time of capturing when stitching the still images captured by the hovering camera 100.

At the time of calculation of the damage position, the damage position calculating unit 334 may use the information of the imaging positions of the captured images (for example, each of the four corners) of the corners among the captured images serving as the basis of the image stitched by the image combining unit 336. As described above, since the still images of the four corners among the captured images serving as the basis of the stitched image are considered to be smallest in distortion, the damage position calculating unit 334 can obtain the more accurate damage position using the information of the imaging positions of the still images of the four corners among the captured images serving as the basis of the stitched image.

The damage data generating unit 338 generates the damage data using the absolute position of the damaged portion of the bridge 1 calculated by the damage position calculating unit 334. The damage data generating unit 338 may generate the damage data in units of still images or may generate damage data on the one image stitched by the image combining unit 336.

The storage unit 340 stores various types of information. The information stored in the storage unit 340 may include, for example, the still images captured by the imaging device 101 of the hovering camera 100, the information of the absolute imaging position of the hovering camera 100 when the still images are captured, and information of the damage data generated by the damage data generating unit 338.

The information processing device 300 according to an embodiment of the present disclosure has the configuration illustrated in FIG. 15 and can generate the damage data from the still image captured by the hovering camera 100, and thus, the information processing device 300 according to an embodiment of the present disclosure can efficiently generate the inspection result of the bridge 1 serving as the structure of the inspection target. As described above, the damage data may be generated by the control terminal 200 rather than the information processing device 300. Thus, the control terminal 200 may have the configuration of the control unit 330 of the information processing device 300 illustrated in FIG. 15. Further, the inspection result of the bridge 1 serving as the structure of the inspection target may be accumulated in a public or private database and used. Further, as described above, the damage data may be generated by the control terminal 200 rather than the information processing device 300. Thus, the control terminal 200 may have the configuration of the control unit 330 of the information processing device 300 illustrated in FIG. 15.

The exemplary function configuration of the information processing device 300 according to an embodiment of the present disclosure has been described above with reference to FIG. 15. Next, an exemplary operation of the information processing device 300 according to an embodiment of the present disclosure will be described.

(1.5.2. Exemplary Operation)

Figure 16:
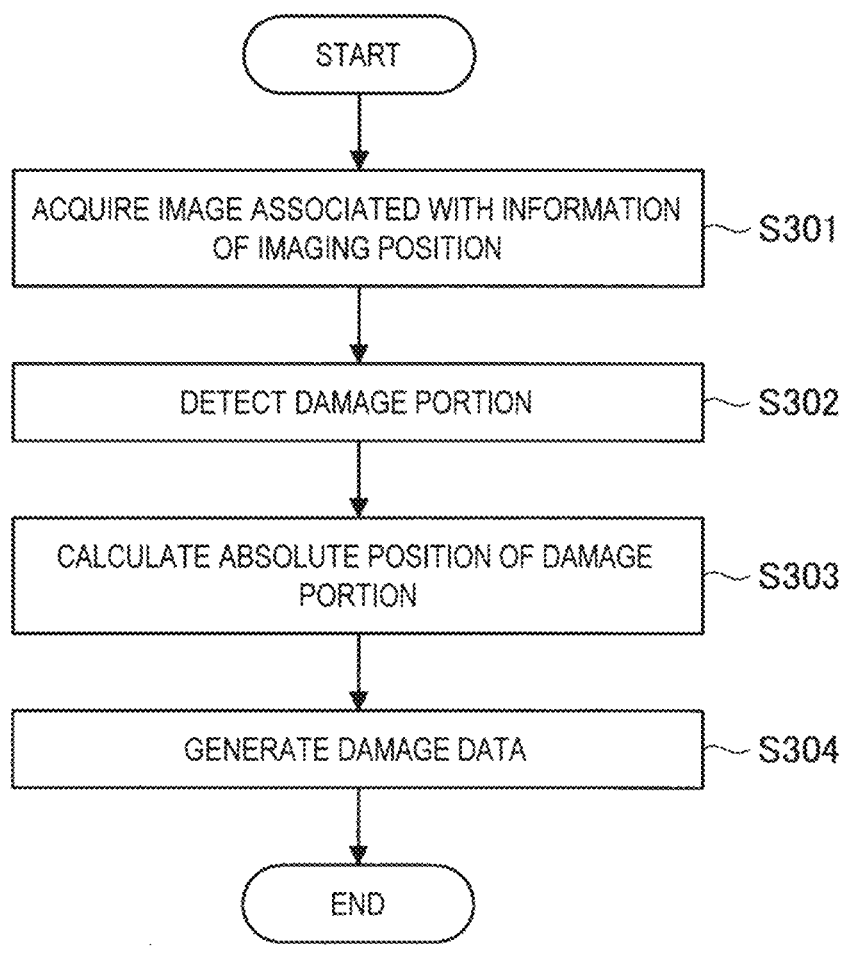
FIG. 16 is a flowchart illustrating an exemplary operation of an information processing device 300 according to an embodiment of the present disclosure.

FIG. 16 is a flowchart illustrating an exemplary operation of the information processing device 300 according to an embodiment of the present disclosure. FIG. 16 illustrates an exemplary operation of the information processing device 300 according to an embodiment of the present disclosure when the absolute position of damage of the bridge girder 3 is acquired from the still image captured by the hovering camera 100, and the damage data is generated. An exemplary operation of the information processing device 300 according to an embodiment of the present disclosure will be described below with reference to FIG. 16.

First, the information processing device 300 acquires the image that is associated with the information of the imaging position and captured by the hovering camera 100 flying over the periphery of the bridge 1 (step S301). When the image associated with the information of the imaging position is acquired in step S301, the information processing device 300 then detects the damaged portion from the image, for example, using an image processing technique such as pattern matching (step S302). The damaged portion detection process of step S302 may be executed, for example, by the damage position calculating unit 334.

When the damaged portion is detected from the image in step S302, the information processing device 300 then calculates the absolute position of the damaged portion (step S303). The calculation process of step S303 may be executed, for example, by the damage position calculating unit 334. The information processing device 300 performs the calculating of the absolute position of the damaged portion in step S303 based on the information of the imaging position of the still image captured by the hovering camera 100. At the time of calculation of the absolute position of the damaged portion, the information processing device 300 may estimate the physical size of the imaging range of the hovering camera 100 based on the distance information from the hovering camera 100 to the imaging target (for example, the back surface or the side surface of the bridge girder 3) or the angle of view information of the imaging device 101. The information processing device 300 can determine the physical position information of the damaged portion by estimating the physical relative position from the center of the captured image to the damaged portion and adding position coordinates of the captured image serving as the point of origin to the relative position. The information processing device 300 generates the damage data including the absolute position of the damaged portion (step S304). The damage data generation process of step S304 may be executed, for example, by the damage data generating unit 338.

The information processing device 300 according to an embodiment of the present disclosure can generate the damage data from the still image captured by the hovering camera 100 by performing the operation illustrated in FIG. 15, and thus, the information processing device 300 according to an embodiment of the present disclosure can efficiently generate the inspection result of the bridge 1 serving as the structure of the inspection target. Further, as described above, the damage data may be generated by the control terminal 200 rather than the information processing device 300. Thus, the operation illustrated in FIG. 16 may be executed by the control terminal 200.

Figure 17:
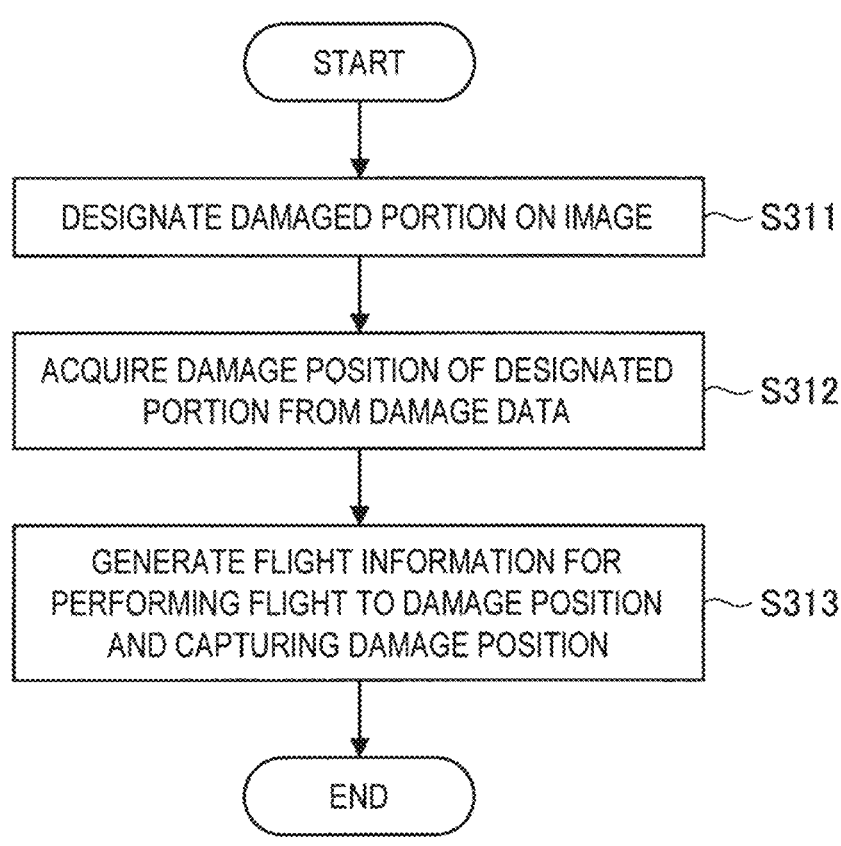
FIG. 17 is a flowchart illustrating an exemplary operation of a control terminal 200 according to an embodiment of the present disclosure.

FIG. 17 is a flowchart illustrating an exemplary operation of the control terminal 200 according to an embodiment of the present disclosure. FIG. 17 illustrates an example of the flight information generation process by the control terminal 200 using the damage data generated by the information processing device 300. An exemplary operation of the control terminal 200 according to an embodiment of the present disclosure will be described below with reference to FIG. 17.

When the still image captured by the hovering camera 100 is displayed on the control terminal 200, and a damaged portion on the still image is designated by the user (step S311), the control terminal 200 acquires the damage position of the designated portion from the damage data generated by the information processing device 300 (step S312). The method of designating a damaged portion is not limited, for example, the still image may be displayed, and the user may designate the damaged portion by touching the touch panel of the control terminal 200 with his/her finger.

When the damage position of the portion designated by the user is acquired from the damage data, the control terminal 200 then generates the flight information of causing the hovering camera 100 to fly over the damage position acquired from the damage data and to capture the damage position (step S313). The process of step S313 may be executed, for example, by the flight information generating unit 232. Since the flight information generated in step S313 by the control terminal 200 is used to check the damage position in detail, flight information that instructs the hovering camera 100 to reduce an interval of imaging positions to be smaller than that in the flight information generated by the control terminal 200 described above with reference to FIG. 5 or to execute special capturing at each imaging position may be used.

When the flight information is generated in step S313, the control terminal 200 transmits the generated flight information to the hovering camera 100, and the hovering camera 100 executes a flight and the imaging process based on the flight information as described in steps S104 and S105 of FIG. 5. Then as described in steps S106 and S107 of FIG. 5, when the imaging process at the last imaging point is completed, the hovering camera 100 flies to the base station 600 automatically in order to return to the base station 600, and the control terminal 200 acquires the images captured by the hovering camera 100 from the hovering camera 100.

The control terminal 200 according to an embodiment of the present disclosure can generate the flight information for causing the hovering camera 100 to capture the damaged portion of the bridge girder 3 in detail using the damage data generated by the information processing device 300 by executing the operation illustrated in FIG. 17.

(1.6. Exemplary Flight Instruction Using Combined Image)

While the following description is provided using the example of a hovering camera provided on a flying body, this disclosure is not so limited and may apply to any vehicle having at least one camera. For example, the following may apply to a hovering vehicle such as a drone equipped with at least one imaging device and that may move along a two- or three-dimensional flight path. However, the following may also apply similarly to a land-based vehicle such as an automobile equipped with at least one imaging device, and that may move along a two-dimensional (ground-based) drive path. Thus, the following description of a "hovering camera" is illustrative only and not limiting. Additionally, the control terminal described below may generate flight (drive) information for a non-linear or polyline flight (drive) path to be followed by the vehicle, instead of the linear path described below.

When by the hovering camera 100 captures a moving image or still images at certain intervals and then transmits the moving image or the still images to the control terminal 200, the control terminal 200 can perform a process (a real-time stitching process) of combining the moving images captured by the hovering camera 100 in units of certain frames or combining the still images captured at certain intervals in real time. The real time mentioned herein is a process of sequentially updating the display of a composite image (especially a combined image) over time and includes a process in which there is a time difference between a time of capturing and a time of an image combination process or image display due to a processing delay or the like. The control terminal 200 can cause the user to designate the target position of the hovering camera 100 using the combined image. Then, the control terminal 200 transmits the flight information for flying to the target position designated by the user to the hovering camera 100.

The control terminal 200 can generate the flight path of the hovering camera 100 for the user more intuitively by combining the images, causing the combined image to be displayed on the display unit 210, and generating the flight information for flying to the target position designated on the display screen of the display unit 210 including the combined image. Further, by generating the combined image from the moving image or the still images captured by the hovering camera 100 and causing the combined image to be displayed on the display unit 210, when it is difficult to obtain an aerial photograph, for example, even for a place such as the back side of the bridge, the control terminal 200 can cause the flight path to be designated using fine image information or a current situation that is hardly obtained through a map or an aerial photograph and does not have to access an external map information database or the like. Further, as the control terminal 200 generates the combined image from the moving image or the still images captured by the hovering camera 100, it is possible to designate the flight path of the hovering camera 100 indoors.

Figure 18:
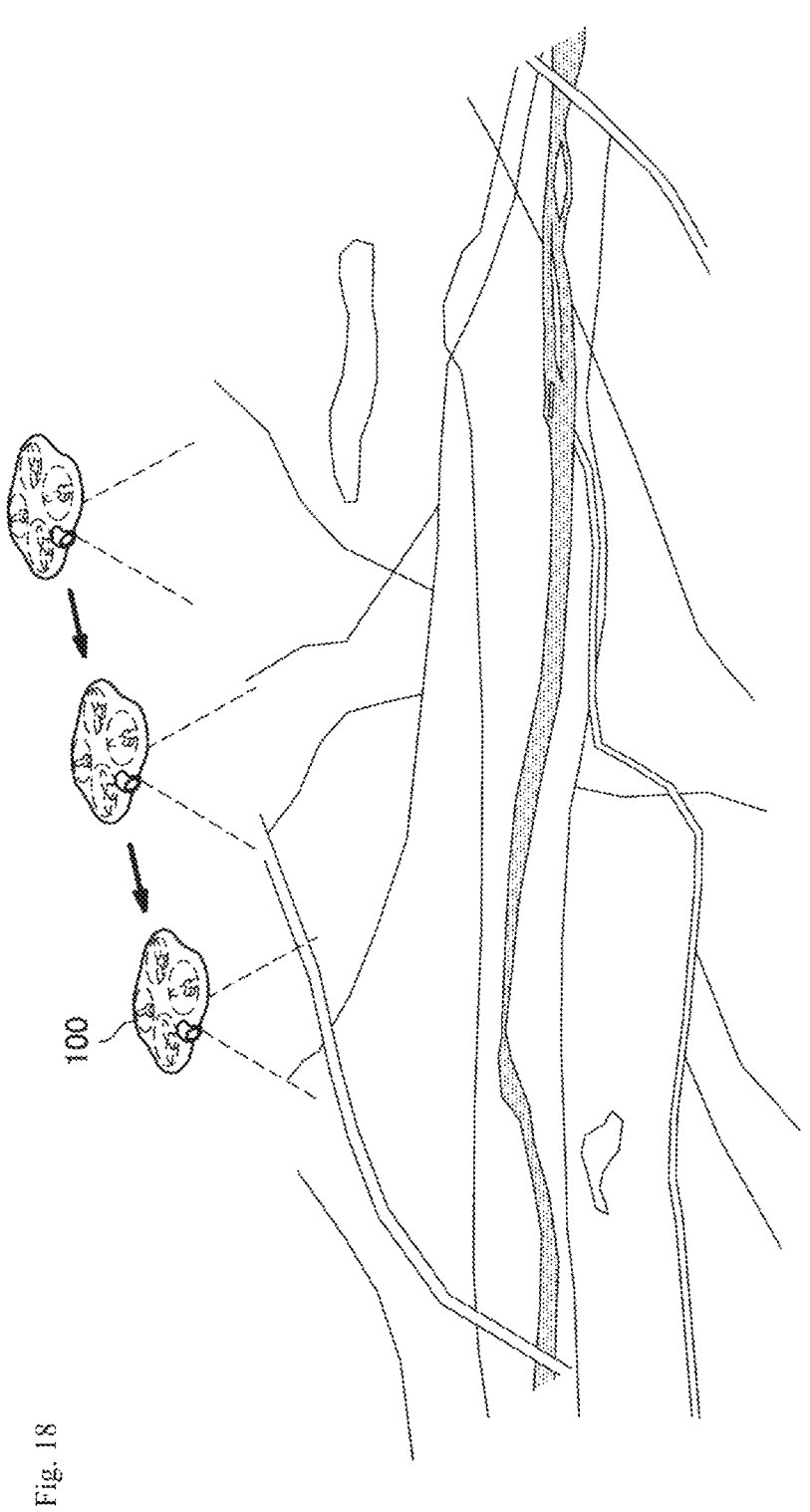
FIG. 18 is an explanatory diagram illustrating an example in which a hovering camera 100 is caused to capture a ground direction.
Figure 19:
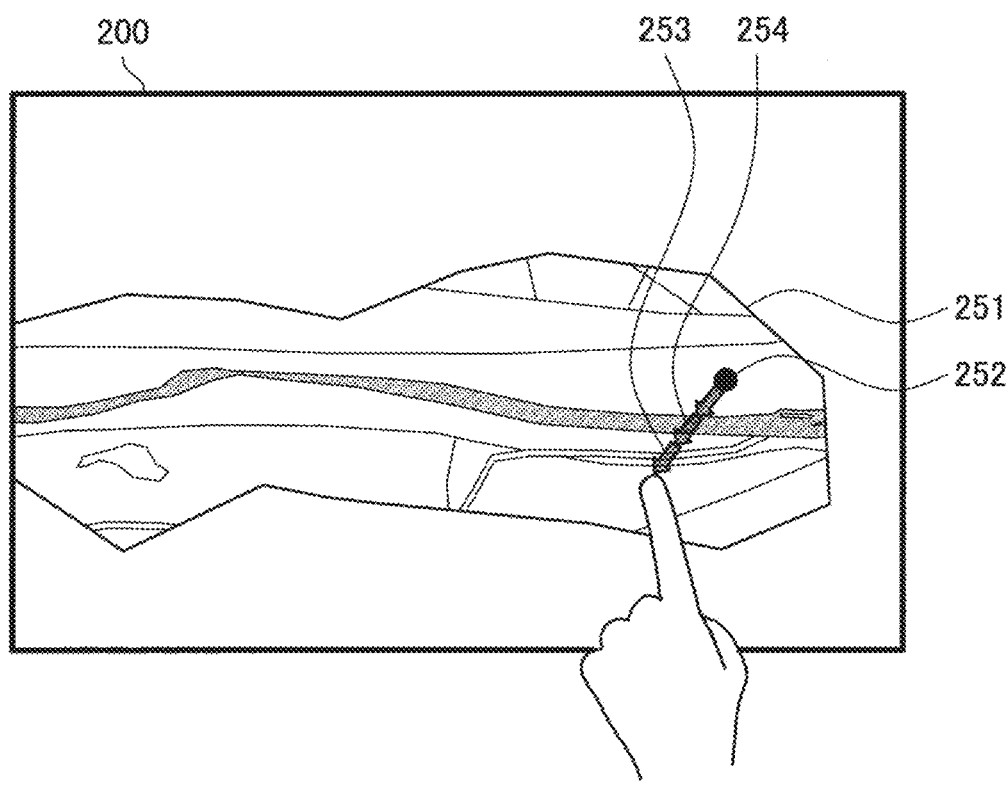
FIG. 19 is an explanatory diagram illustrating an example in which a user is caused to designate a flight path of a hovering camera 100 using a combined image.

FIG. 18 is an explanatory diagram illustrating an example in which the hovering camera 100 is caused to fly and image in a ground direction. FIG. 19 is an explanatory diagram illustrating an example in which the images captured by the hovering camera 100 are combined, and the user is caused to designate the flight path of the hovering camera 100 using the combined image.

Referring to FIG. 19, a current position mark 252 indicating the current position of the hovering camera 100 is displayed on a combined image 251 obtained as a result of capturing from the sky in a superimposed manner. The control terminal 200 uses, for example, feature point matching or the like when generating the combined image 251 as will be described below.

For example, when the user designates a target position 253 of the hovering camera 100 on the combined image 251 as illustrated in FIG. 19, the control terminal 200 generates the flight information for causing the hovering camera 100 to fly along a flight path 254 from the current position mark 252 to the target position 253, and transmits the flight information to the hovering camera 100. The hovering camera 100 performs a flight based on the flight information transmitted from the control terminal 200.

Figure 20:
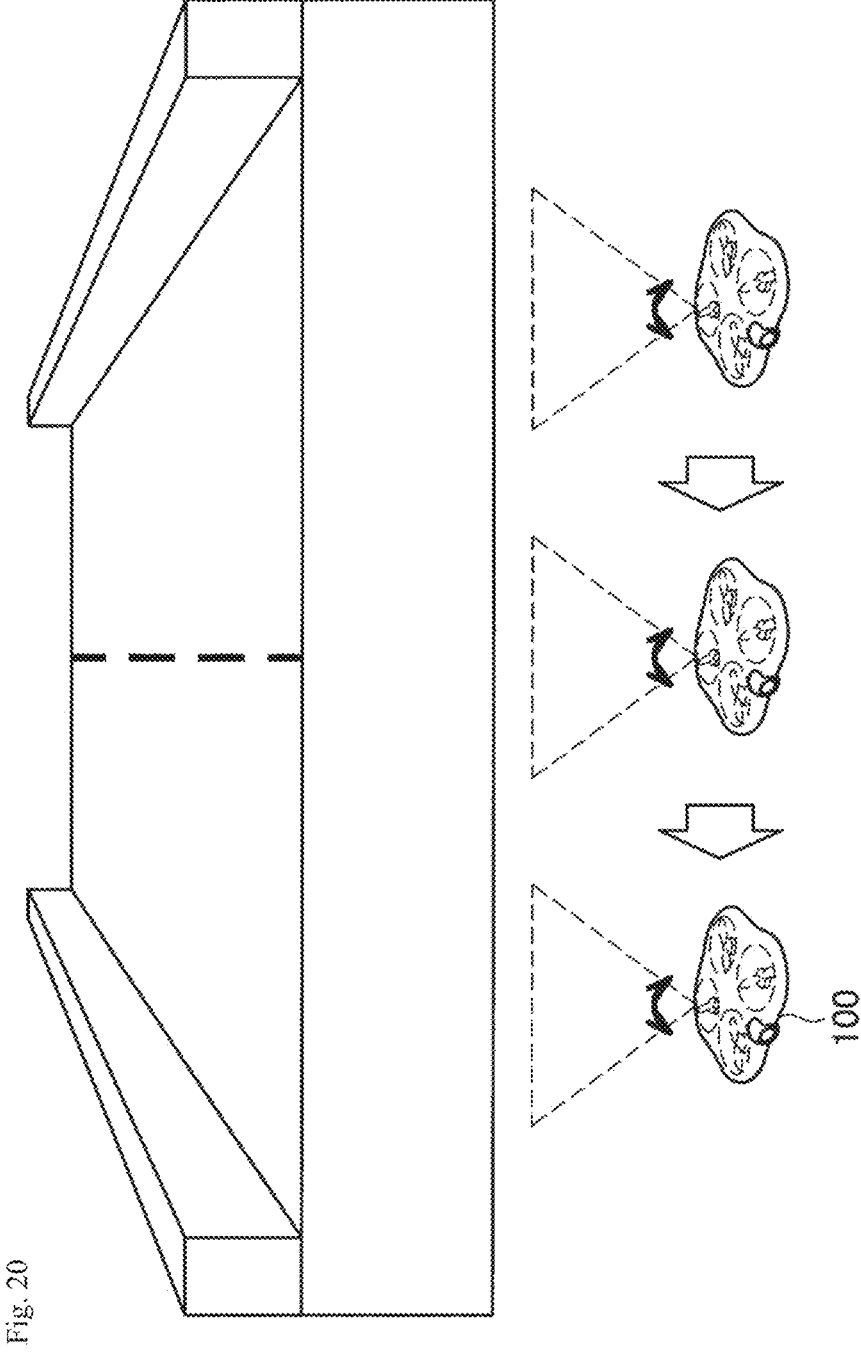
FIG. 20 is an explanatory diagram illustrating an example in which a hovering camera 100 is caused to capture an upward direction (a back surface of a bridge).
Figure 21:
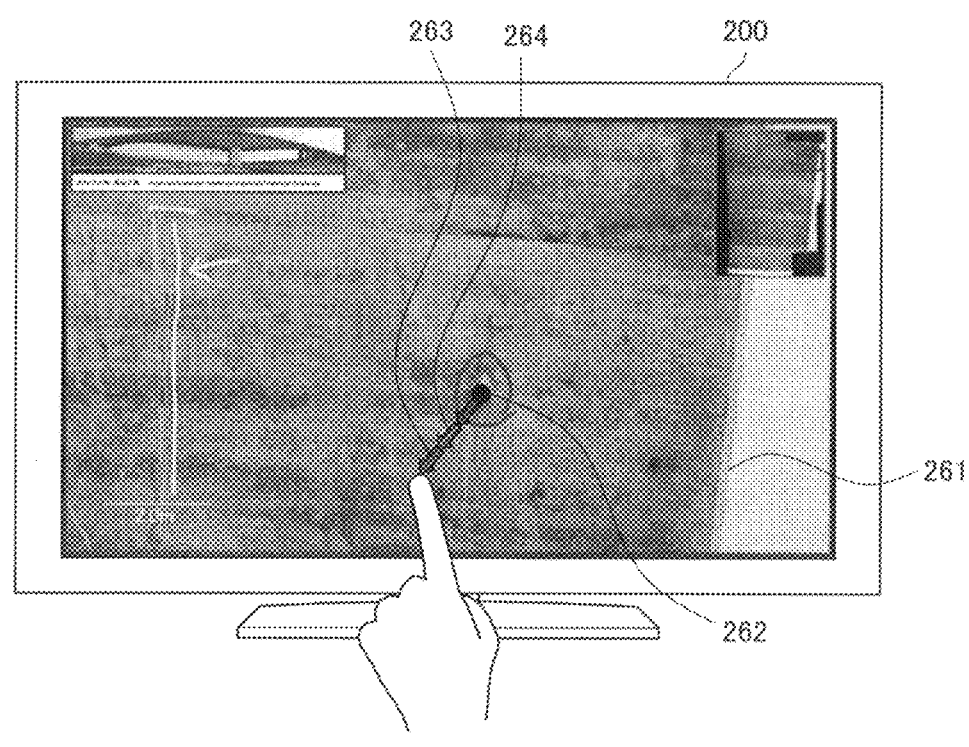
FIG. 21 is an explanatory diagram illustrating an example in which a user is caused to designate a flight path of a hovering camera 100 using a combined image.

FIG. 20 is an explanatory diagram illustrating an example in which the hovering camera 100 is caused to fly and capture in an upward direction (the back surface of the bridge). FIG. 21 is an explanatory diagram illustrating an example in which the images captured by the hovering camera 100 are combined, and the user is caused to designate the flight path of the hovering camera 100 using the combined image.

Referring to FIG. 21, similar to FIG. 19, a current position mark 262 indicating the current position of the hovering camera 100 is displayed on a combined image 261 obtained as a result of capturing the back surface of the bridge in a superimposed manner. The control terminal 200 uses, for example, feature point matching when generating the combined image 261 as will be described below.

For example, when the user designates a target position 263 of the hovering camera 100 on the combined image 261 as illustrated in FIG. 21, the control terminal 200 generates the flight information for causing the hovering camera 100 to fly along a flight path 264 from the current position mark 262 to the target position 263, and transmits the flight information to the hovering camera 100. The hovering camera 100 performs a flight based on the flight information transmitted from the control terminal 200.

Figure 22:
FIG. 22 is an explanatory diagram illustrating an example in which a control terminal 200 generates and displays a combined image.

A combined image generation example by the control terminal 200 will be first described. FIG. 22 is an explanatory diagram illustrating an example in which the combined image is generated by the control terminal 200 and displayed on the display unit 210. The following process may be executed, for example, the display control unit 234 of the control terminal 200. Thus, the display control unit 234 may function as an example of the image processing unit of the present disclosure.

FIG. 22 illustrates an example in which the control terminal 200 generates a combined image, for example, using an image group 271 captured at times t–5 to t–1 and an image 272 captured at a time t. When the image 272 captured at the time t is transmitted to the control terminal 200, the control terminal 200 performs matching between a feature point of the image 272 captured at the time t and a feature point of the image captured at the time t–1 among the image group 271. The control terminal 200 performs matching between the feature point of the image 272 captured at the time t and a feature point of the combined image previously combined using the image group 271.

Then, the control terminal 200 obtains a rotation•translation parameter (or an affine transform parameter) that is smallest in a position error of a feature point. Then, the control terminal 200 combines (performs a blending on) the combined images generated by the stitching process to date based on the new image 272 through a transform using the rotation•translation parameter (or the affine transform parameter). The control terminal 200 can generate, for example, a new combined image in which the image captured at the time t is located at the center of the combined image through this combination. Then, the control terminal 200 displays the combined image so that the center of the combined image, that is, a center 273 of the image captured at the time t is the position of the hovering camera 100.

Next, the flight path generation process of the control terminal 200 based on the user's input on the combined image generated as described above will be described.

Figure 23:
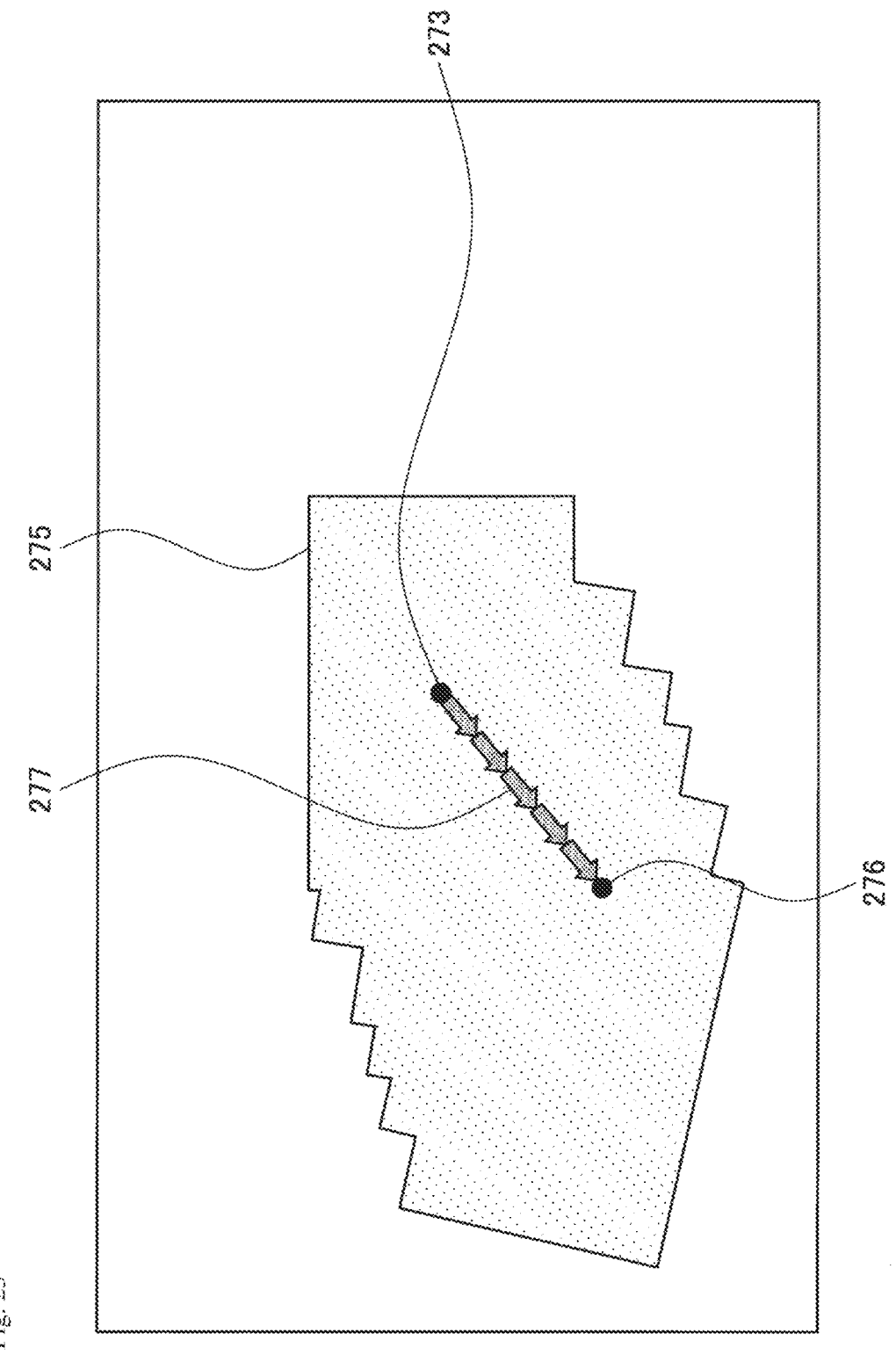
FIG. 23 is an explanatory diagram for describing a flight path generation process of a control terminal 200 based on a user's input on a combined image.

FIG. 23 is an explanatory diagram for describing the flight path generation process of the control terminal 200 based on the user's input on the combined image. When the user designates a target position 276 on a combined image 275 generated by the control terminal 200, a direction from the current position of the hovering camera 100 to the target position is acquired. Since the combined image is generated based on the image captured by the hovering camera 100, the direction of the target position indicates a current direction from the hovering camera 100. When the hovering camera 100 is in a mode in which acquisition of position information by the GPS is possible, autonomous flight is performed based on the GPS position information (an autonomous flight mode). When an abnormality of the GPS is detected, switching to a user operation flight mode in which a target position is designated by a user operation and in which a position is estimated using a combined image is performed with regard to the mode of the hovering camera 100, and autonomous flight is performed based on the target position information and the estimated position information. The abnormality of the GPS refers to a state in which it is hard for the hovering camera 100 to stably receive the radio waves from the GPS satellites, for example, a state in which a GPS signal level is lower than a threshold value, the GPS position information drastically changes, or the position information acquired from the GPS satellites is different from a value of an acceleration sensor. In the user operation flight mode, the control unit 110 of the hovering camera 100 recognizes a real space through an image recognition process such as simultaneous localization and mapping (SLAM). Subsequently, the control unit 110 associates the real space with coordinates on the combined image, and thus it is possible to calculate a direction and a distance of a target position viewed from a current position. In the case of the position estimation by the image recognition process, movement amounts may be estimated by the control unit 110 using an acceleration sensor and a gyro sensor and combined in the image recognition process. Switching between the autonomous flight mode and the user operation flight mode is controlled by control unit 110 of the hovering camera 100 or control unit of the control terminal 200. The abnormality of the GPS is also detected by control unit 110 of the hovering camera 100 or control unit of the control terminal 200.

The control terminal 200 can cause the user to change the reduction scale of the combined image appropriately. Particularly, when the user inputs a target position on the combined image, the control terminal 200 can set a more detailed target position by causing the user to change the reduction scale of the combined image. Further, it is possible to designate an arbitrary portion on the display screen of the display unit 210 including the combined image as the target position 276. In other words, in addition to a portion in the combined image, a portion (for example, a display area other than the combined image 275 in FIG. 25) that is not captured by the hovering camera 100 may be designated by the user.

For example, the imaging device is assumed to be installed in the hovering camera 100 downward so that an upward direction of a captured image is a front direction of the hovering camera 100, and a left direction is a left direction of the hovering camera 100. Thus, when the user designates the target position 276 on the combined image 275 illustrated in FIG. 23, the target position 276 is in a left rear direction when viewed from the current position of the hovering camera 100 (that is, the center 273).

Thus, the control terminal 200 determines a flight path 277 in which the hovering camera 100 flies in the left rear direction when viewed from the current position of the hovering camera 100, generates flight information for performing a horizontal flight along the flight path 277, and transmits the generated flight information to the hovering camera 100. The determining of the flight path 277 and the generating of the flight information may be executed, for example, by the flight information generating unit 232. The hovering camera 100 performs a horizontal flight in the left rear direction based on the flight information transmitted from the control terminal 200. The flight information may be only a direction to the target position 276 or may include a direction and a distance to the target position 276. When only the direction to the target position 276 is used as the flight information, if a process to direct a course toward the destination is continuously performed, feedback is performed so that the hovering camera 100 stays at the target position 276 even after arriving, and thus the hovering camera 100 can arrive at the destination. In this case, a process of calculating a distance to the target position from the scale of the combined image is unnecessary, and the processing load of the control unit 110 is reduced. The control unit 110 may determines whether or not the hovering camera 100 has arrived at the destination using the image recognition process. When the determining is performed using the image recognition process, arrival at the destination can be determined even in an environment in which it is difficult to receive the GPS information. When the direction and the distance to the target position 276 are used as the flight information, a notification indicating that the hovering camera 100 has arrived near the destination can be given to the user by the control terminal 200. For example, when the remaining distance from the current position to the target position is below 5 pixels on the combined image, a notification indicating that the hovering camera 100 has arrived near the destination may be given to the user by the control terminal 200.

Figure 24:
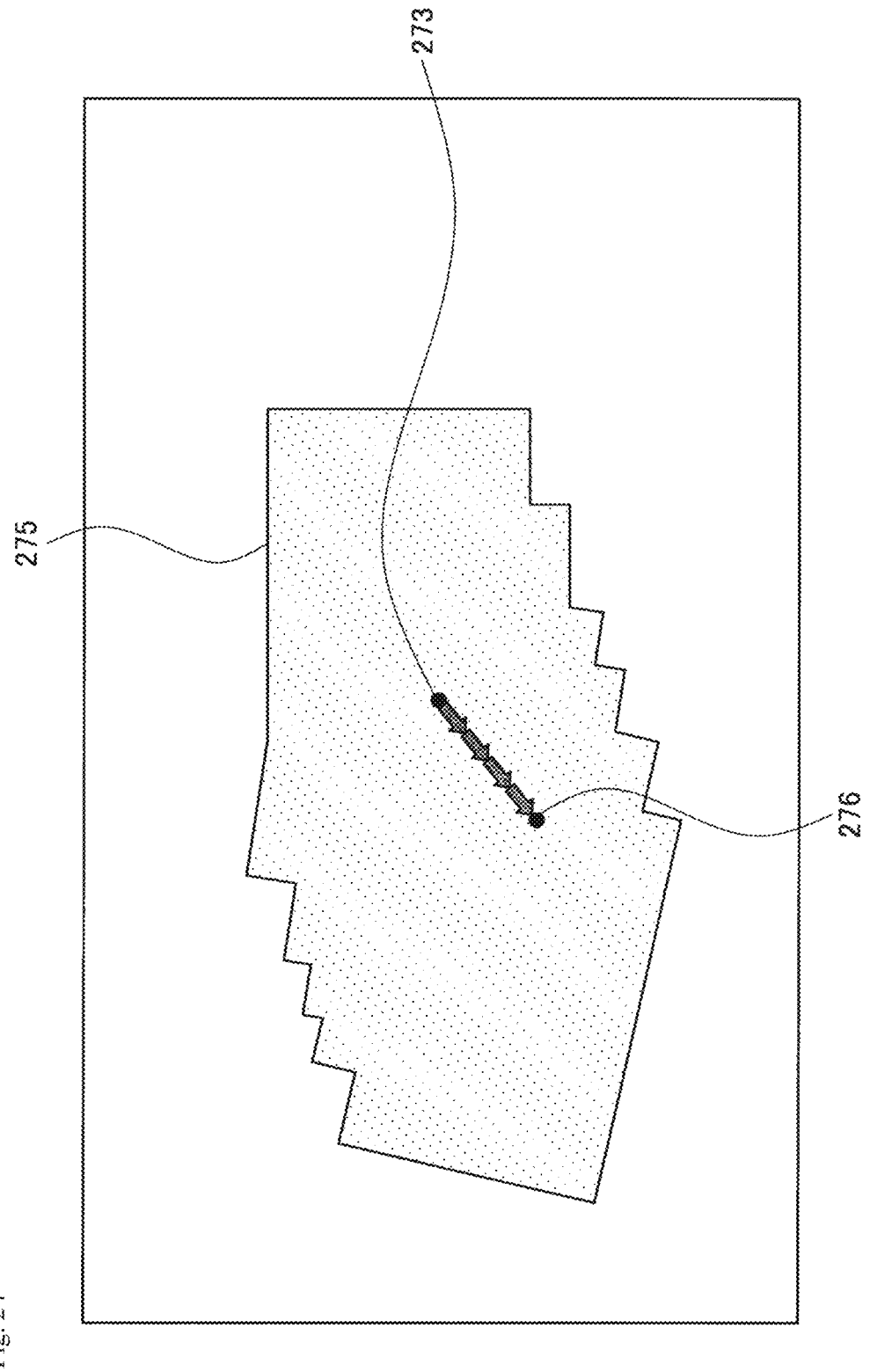
FIG. 24 is an explanatory diagram illustrating an exemplary combined image.

Then, with the start of the horizontal flight of the hovering camera 100, the control terminal 200 can obtain a new captured image through the hovering camera 100. The control terminal 200 updates the combined image using the new captured image obtained by the movement of the hovering camera 100. The control terminal 200 updates not only the direction or position of the image but also the target position when updating the combined image. As the direction or position of the image and the target position are updated, the target position moves together with the position when designated by the user. FIG. 24 is an explanatory diagram illustrating an exemplary combined image updated using a new captured image obtained by movement of the target position 276 of the hovering camera 100. In FIG. 24, when compared to FIG. 23, the position of the center 273 is substantially the same, and the target position 276 is approaching the center 273. In other words, it is understood from FIG. 24 that the target position 276 has moved from its position illustrated in FIG. 23.

The control terminal 200 generates the flight information by performing feedback control such that the target position 276 approaches the center 273 by a certain distance or less through new capturing by the hovering camera 100 and updating of the combined image, and transmits the generated flight information to the hovering camera 100.

In this example, the method of moving the hovering camera 100 to the target position without rotation of the hovering camera 100 has been described, but the present disclosure is not limited to the relevant example. When the target position is designated, the control terminal 200 may first generate the flight information for rotating the hovering camera 100 toward the target position and may generate the flight information for moving toward the target position after rotating the hovering camera 100. Even when the hovering camera 100 is caused to be rotated, the control terminal 200 performs the feature point matching as described above, and thus it is possible to rotate the combined image with the rotation of the hovering camera 100.

Further, a movement direction in an image differs according to a method of attaching the imaging device to the hovering camera 100. Thus, for example, when the imaging device 101 is attached to the hovering camera 100 upwardly, the movement direction is opposite to that when attached downwardly. Further, in the present embodiment, the control terminal 200 may control movement of the hovering camera 100 in the vertical direction in addition to movement of the hovering camera 100 in the horizontal direction. For example, when the hovering camera 100 is operated to land after moving horizontally, the control terminal 200 displays a slider for movement in the vertical direction on the screen, and the user may perform an operation of causing the hovering camera 100 to land by operating the slider.

Figure 25:
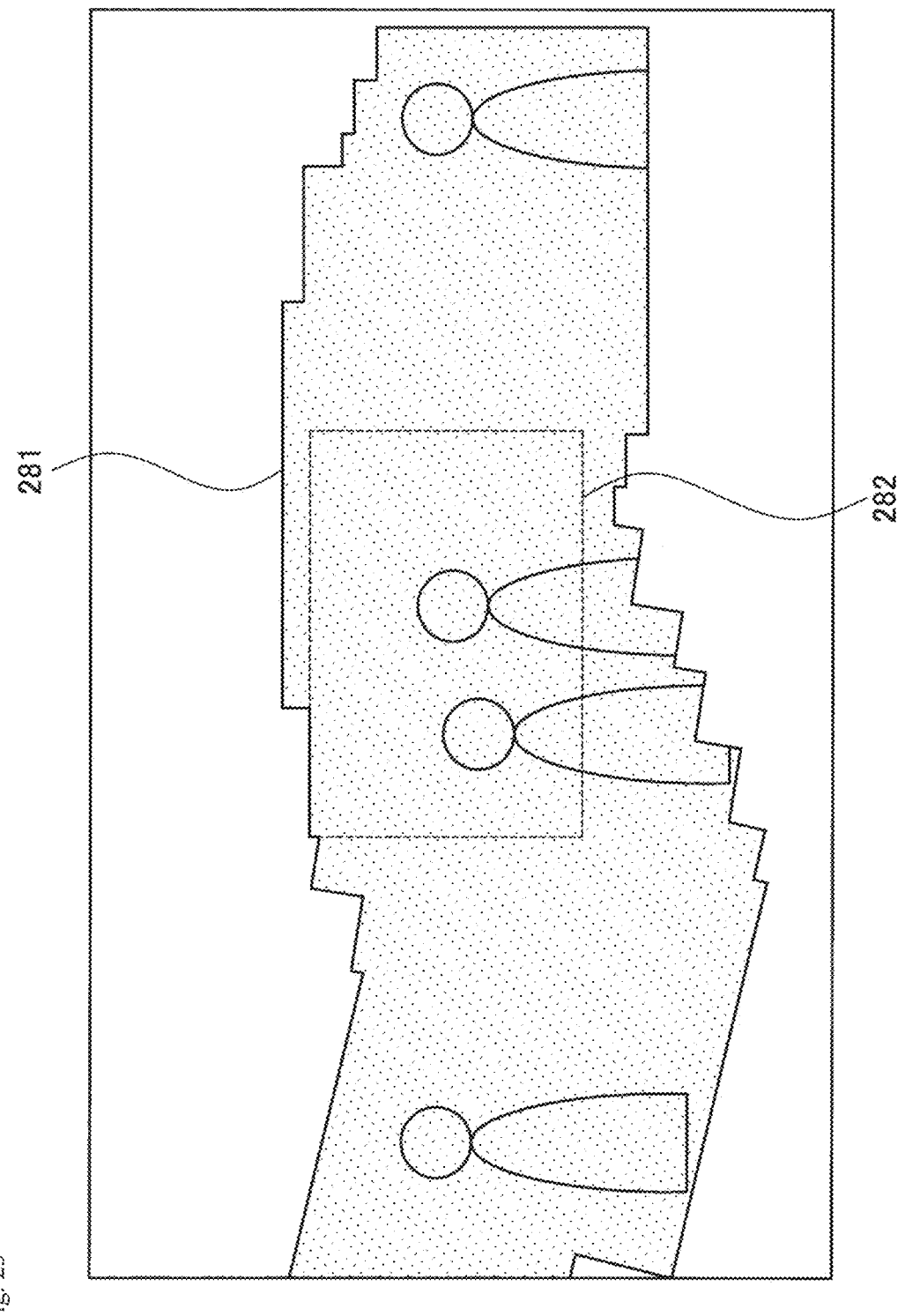
FIG. 25 is an explanatory diagram illustrating an exemplary combined image.

Of course, the imaging device 101 can be installed in the hovering camera 100 in a transverse direction as well. When the imaging device 101 is installed in the hovering camera 100 in the transverse direction, the movement direction of the hovering camera 100 becomes a combination of the vertical direction and rotation or a combination of the vertical and horizontal directions. FIG. 25 is an explanatory diagram illustrating an exemplary combined image when the imaging device 101 is installed in the hovering camera 100 in the transverse direction. FIG. 25 illustrates a combined image 281 generated from the images captured by the hovering camera 100. A portion surrounded by a reference numeral 282 indicates an image that is captured at the current position by the hovering camera 100.

An exemplary operation of the control terminal 200 according to an embodiment of the present disclosure will be described based on the above description.

Figure 26:
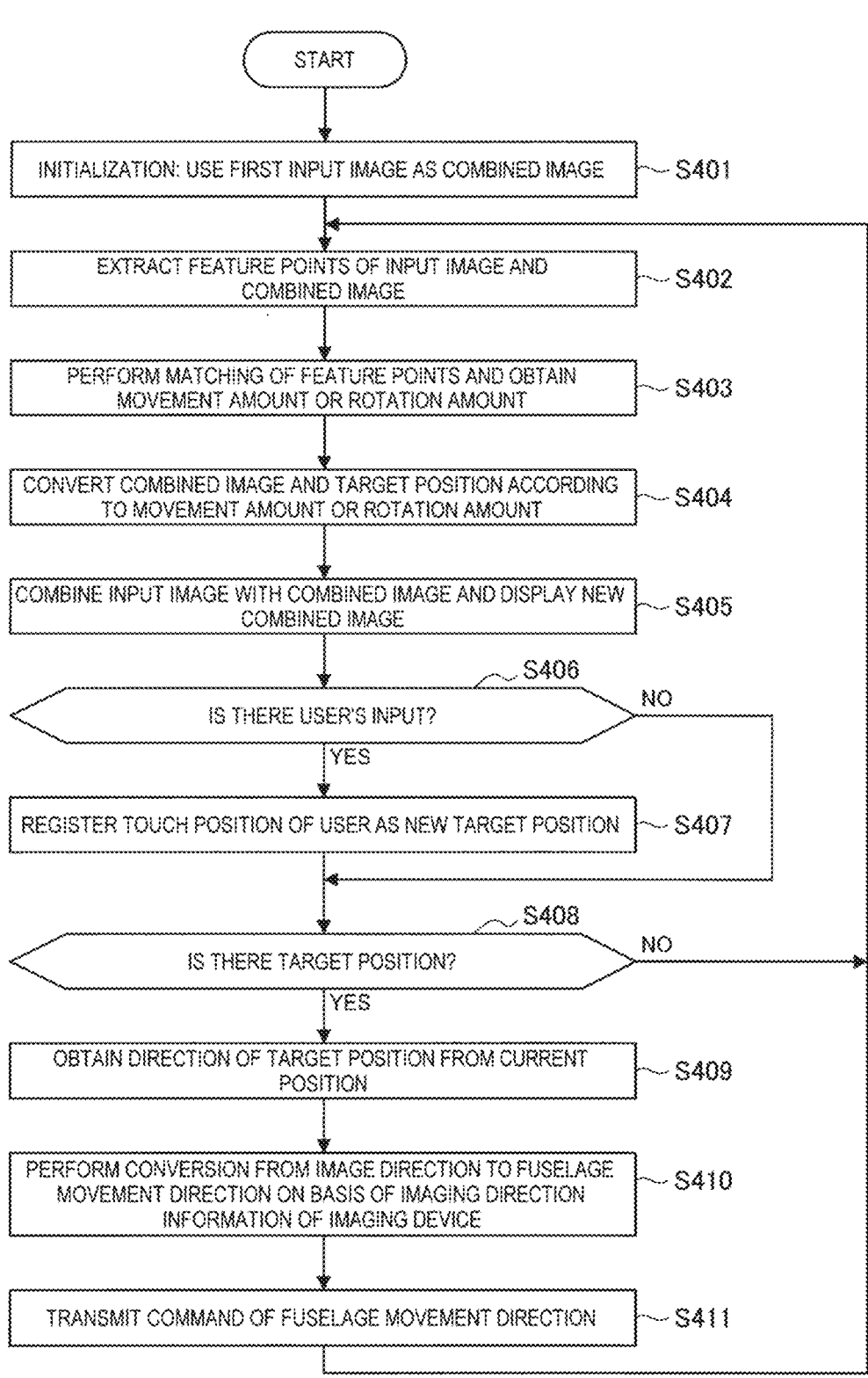
FIG. 26 is a flowchart illustrating an exemplary operation of a control terminal 200 according to an embodiment of the present disclosure.

FIG. 26 is a flowchart illustrating an exemplary operation of the control terminal 200 according to an embodiment of the present disclosure. FIG. 26 illustrates an exemplary operation of the control terminal 200 when the combined image is generated from the images captured by the hovering camera 100, the flight information is generated based on the combined image, and the flight information is transmitted to the hovering camera 100.

The control terminal 200 first performs an initialization process through the display control unit 234 (step S401). The initialization process is a process of using the captured image initially transmitted from the hovering camera 100 as an input image and using the input image as a first combined image.

Then, the control terminal 200 uses the image captured by the hovering camera 100 as the input image, and extracts the feature points of the input image and the combined image through the display control unit 234 (step S402). When the feature points are extracted, the control terminal 200 then performs matching of the extracted feature points, and calculates a movement amount or a rotation amount between the feature points through the display control unit 234 (step S403).

Then, the control terminal 200 converts the combined image according to the movement amount or the rotation amount between the feature points obtained in step S403 through the display control unit 234 (step S404). At the time of the conversion, when the target position has been already designated, the control terminal 200 performs the conversion according to even the target position through the display control unit 234.

Then, the control terminal 200 combines a previous combined image with the input image to generate a new combined image, and performs the process of displaying the combined image through the display control unit 234 (step S405).

Then, the control terminal 200 determines whether or not there is the user's input on the display unit 210 on which the combined image is being displayed through the display control unit 234 (step S406). For example, the user's input on the display unit 210 on which the combined image is being displayed is the user's input on the touch panel installed in the display unit 210. Further, when there is the user's input on the touch panel installed in the display unit 210, the control terminal 200 detects a coordinate position of the image input by the user, for example, through the display control unit 234. When there is the user's input on the combined image (Yes in step S406), the control terminal 200 performs a process of registering the user's touch position as the target position through the display control unit 234 (step S407). When there is no user's input on the combined image (No in step S406), the control terminal 200 skips the process of step S407.

Then, the control terminal 200 determines whether or not the target position has been registered through the display control unit 234 (step S408). When the target position has been registered (Yes in step S408), the control terminal 200 then obtains the direction of the target position from the current position through the display control unit 234 (step S409).

When the direction of the target position from the current position is obtained, the control terminal 200 then performs conversion from the direction on the image to the movement direction of the fuselage of the hovering camera 100 based on the imaging direction information (according to the attachment) of the imaging device 101 (step S410). Then, the control terminal 200 generates a command for performing movement in the converted movement direction as the flight information through the flight information generating unit 232, and transmits the generated flight information to the hovering camera 100 (step S411).

When the flight information is transmitted to the hovering camera 100, the control terminal 200 returns to the feature point extraction process of step S402.

On the other hand, when the target position is determined to have not been registered in step S408 (No in step S408), the control terminal 200 skips the process of steps S409 to S411 and returns to the feature point extraction process of step S402.

The control terminal 200 according to an embodiment of the present disclosure performs the above-described process and thus can combine the images captured by the hovering camera 100 as necessary, generate the combined image, generate the flight information for flying to the position designated on the combined image, and transmit the flight information to the hovering camera 100.

In this above example, the control terminal 200 generates the flight information for controlling the flight of the hovering camera 100 according to the touch process on the combined image, but the present disclosure is not limited to the relevant example.

For example, the control terminal 200 may generate the flight information for controlling the flight of the hovering camera 100 according to the reduction process by the pinch-in operation on the combined image, the enlargement process by the pinch-out operation on the combined image, or the rotation operation on the combined image.

In other words, when the pinch-in operation (the operation of reducing the combined image) on the combined image is performed, the control terminal 200 may generate the flight information for causing the hovering camera 100 to move far away from the imaging target. Further, when the pinch-out operation (the operation of enlarging the combined image) on the combined image is performed, the control terminal 200 may generate the flight information for causing the hovering camera 100 to approach the imaging target. Specifically, control is performed such that the flight information is generated based on the information indicating the imaging direction of the imaging device 101 installed in the hovering camera 100. For example, in the pinch-in operation performed on the combined image, when the imaging direction is the downward direction of the hovering camera, the flight path information for instructing the ascent of the hovering camera is generated, and the hovering camera moves far away from the imaging target, and when the imaging direction is the upward direction of the hovering camera, the flight path information for instructing the descent of the hovering camera is generated, and the hovering camera moves far away from the imaging target. Further, when the rotation operation is performed by the touch operation on the combined image, the control terminal 200 may generate the flight information so that rotation is performed in a state in which the imaging device 101 of the hovering camera 100 faces the imaging target.

In the above example, although the combination process of the images captured by the hovering camera 100 is performed by the control terminal 200, and the flight instruction is transmitted from the control terminal 200 to the hovering camera 100, the technology of the present embodiment can be applied to control of, for example, all mobile objects such as a robot equipped with an imaging device.

In the above example, the combination process of the images captured by the hovering camera 100 is performed by the control terminal 200, and the flight instruction is transmitted from the control terminal 200 to the hovering camera 100. In this case, the image captured by the hovering camera 100 is transmitted from the hovering camera 100 to the control terminal 200 each time capturing is performed, and the flight information generated by the control terminal 200, that is, the information for enabling the hovering camera 100 to directly interpret the movement direction is transmitted from the control terminal 200 to the hovering camera 100 each time the flight information is generated and updated.

However, the present disclosure is not limited to the relevant example. For example, the hovering camera 100 may perform the extracting of the parameter by imaging processing of the image captured by the hovering camera 100 and the generating of the command for controlling the flight of the hovering camera 100, and the control terminal 200 may perform the combination process on the images captured by the hovering camera 100 and may receive only the input of the target position from the user. In this case, the image captured by the hovering camera 100 is transmitted from the hovering camera 100 to the control terminal 200 each time capturing is performed, and the information of the target position designated by the user is transmitted from the control terminal 200 to the hovering camera 100 each time the user designates the target position.

Since the hovering camera 100 performs the extracting of the parameter by imaging processing of the image captured by the hovering camera 100 and the generating of the command for controlling the flight of the hovering camera 100, the feedback control is completed only inside the hovering camera 100. Thus, even when communication traffic necessary for exchange of information between the control terminal 200 and the hovering camera 100 is reduced or communication between the control terminal 200 and the hovering camera 100 is disconnected, it is possible to cause the hovering camera 100 to fly safely.

Further, in the above example, the combined image is generated so that the image most recently captured by the hovering camera 100 is positioned at the center of the screen, but the present disclosure is not limited to the relevant example. In other words, the image captured by the hovering camera 100 may be combined with the combined image in a state in which the display position of the combined image is fixed. When the display position of the combined image is fixed, the target position is fixed, and the current position of the hovering camera 100 is moved as the combined image is updated. Further, when the display position of the combined image is fixed and the combined image reaches the end portion of the screen by the update of the combined image, the current position and the target position may be updated by scrolling the entire combined image so that the most recently captured image fits within the screen.

The imaging device 101 may not be attached to the hovering camera 100 so that the imaging direction is fixed, and, for example, the imaging device 101 may be attached to the hovering camera 100 so that the imaging direction is changed by a motor or the like. When the imaging device 101 is attached to the hovering camera 100 so that the imaging direction is changed, for example, the control unit 110 may detect the imaging direction of the imaging device 101, and the combined image generation process and the process of designating the movement direction of the hovering camera 100 may be performed according to the imaging direction detected by the control unit 110.

2. Conclusion

As described above, according to an embodiment of the present disclosure, the hovering camera 100 that performs an automatic flight based on set flight information and captures a structure of an inspection target and the inspection system 10 that is capable of checking a damage state of a structure based on a still image captured by the hovering camera 100 are provided.

The inspection system 10 according to an embodiment of the present disclosure uses information related to a structure of an inspection target when generating flight information to be transmitted to the hovering camera 100. Using the information related to the structure of the inspection target, the control terminal 200 can generate flight information for causing the hovering camera 100 to fly and efficiently inspecting a structure of an inspection target.

Further, according to an embodiment of the present disclosure, the control terminal 200 that is capable of generating a combined image from images captured by the hovering camera 100 and generating flight information for moving the hovering camera 100 according to an input on the combined image is provided. The control terminal 200 according to an embodiment of the present disclosure can enable the user to intuitively operate the hovering camera 100 by generating a combined image from images captured by the hovering camera 100 and generating flight information for moving the hovering camera 100 according to an input on the combined image. Thus, the control terminal 200 according to an embodiment of the present disclosure can enable the user to operate the hovering camera 100 easily without forcing the user to perform a complicated operation.

In the above embodiment, the example of the inspection system 10 in which an image captured by the hovering camera 100 is a still image, and a damage state of the bridge 1 is inspected using the still image has been described, but the present disclosure is not limited to the relevant example. The hovering camera 100 may capture a moving image of the bridge 1 while flying, and the information processing device 300 may generate damage data using the moving image captured by the hovering camera 100. The hovering camera 100 acquires position information periodically when a moving image imaging process is performed and associates an imaging time of a moving image with an acquisition time of position information, and thus the information processing device 300 can generate damage data using a moving image.

It is not necessary to perform each step of a process executed by each device of the present specification in the chronological order described in a sequence diagram or a flowchart. For example, each step of a process executed by each device may be performed in an order different from the order described as a flowchart, or may be performed in parallel.

In addition, a computer program for causing hardware such as a CPU, a ROM, and a RAM installed in each device to exhibit the equivalent functions to those of each of the devices described above can also be created. In addition, a storage medium in which such a computer program is stored can also be provided. In addition, by configuring each of the functional blocks shown in the functional block diagram to be hardware or a hardware circuit, a series of processes can also be realized using hardware or a hardware circuit. Further, some or all functional blocks illustrated in the functional block diagrams used in the above description may be implemented by a server device connected via a network such as the Internet. Further, each of components of functional blocks illustrated in the functional block diagrams used in the above description may be implemented by a single device or may be implemented by a system in which a plurality of devices collaborate with each other. Examples of the system in which a plurality of devices collaborate with each other include a combination of a plurality of server devices and a combination of a server device and a terminal device. In addition, the system can be applied to an automobile. For example, a driver can touch a preferable parking space on the composite image. Then, the automobile can be automatically moved to the preferable parking space according to the touch process.

It should be understood by those skilled in the art that various modifications, combinations, sub-combinations and alterations may occur depending on design requirements and other factors insofar as they are within the scope of the appended claims or the equivalents thereof.

In addition, the effects described in the present specification are merely illustrative and demonstrative, and not limitative. In other words, the technology according to the embodiments of the present disclosure can exhibit other effects that are evident to those skilled in the art along with or instead of the effects based on the present specification.

The present disclosure may also take the following configurations.

(1) A vehicle control system, comprising: at least one imaging device attached to a vehicle and configured to capture a plurality of images; and a control circuit configured to generate a composite image from the plurality of images, and to display the composite image on a display unit, wherein the vehicle is operated according to a user operation on a portion of the display unit on which the composite image is being displayed.

(2) The vehicle control system according to (1), wherein the user operation is an operation on the composite image.

(3) The vehicle control system according to (1) or (2), wherein the display unit includes a first display area for displaying the composite image, the user operation is an operation on a second display area of the display unit different from the first display area.

(4) The vehicle control system according to any one of (1) to (3), wherein the control circuit is configured to generate a target position information based on an input position of the user operation on the display unit relative to a vehicle position displayed on the display unit, the input position representing a target position, and the target position information includes a direction from the vehicle position to the target position in a real coordinate system.

(5) The vehicle control system according to (4), wherein the target position information includes a distance from the vehicle position to the target position in the real coordinate system.

(6) The vehicle control system according to (4) or (5), wherein the control circuit is configured to transmit the target position information to the vehicle.

(7) The vehicle control system according to any one of (4) to (6), wherein the control circuit is configured to display the composite image such that the vehicle position on the composite image is located in a center of the display unit.

(8) The vehicle control system according to any one of (4) to (7), wherein the control circuit is configured to change display of the composite image such that the target position on the display unit approaches a center of the display unit as the vehicle approaches the target position in the real coordinate system.

(9) The vehicle control system according to any one of (4) to (8), wherein the user operation is a pinch-in operation, and the vehicle is configured to approach the target position in the real coordinate system in response to the pinch-in operation.

(10) The vehicle control system according to any one of (1) to (9), wherein the vehicle is a hovering machine.

(11) The vehicle control system according to any one of (1) to (10), wherein the vehicle is an automobile.

(12) The vehicle control system according to any one of (1) to (11), wherein the composite image is a stitching image.

(13) The vehicle control system according to (10), wherein the control circuitry is configured to switch a flight mode between an autonomous flight mode and a user operation flight mode, and wherein the hovering machine is operated according to the user operation in the user operation flight mode.

(14) The vehicle control system according to (13), wherein the control circuitry is configured to switch from the autonomous flight mode to the user operation flight mode in accordance with an abnormality of a position information acquisition circuitry.

(15) The vehicle control system according to (14), wherein the position information acquisition circuitry is configured to acquire position information based on global positioning system receiver information.

(16) A vehicle control method, comprising: capturing, via at least one imaging device attached to a vehicle, a plurality of images; generating a composite image from the plurality of images, and displaying the composite image on a display unit; and operating the vehicle according to a user operation on a portion of the display unit on which the composite image is being displayed.

(17) The vehicle control method according to (16), wherein the user operation is an operation on the composite image.

(18) The vehicle control method according to (16) or (17), wherein displaying the composite image on the display unit includes displaying the composite image on a first display area of the display unit, and the user operation is an operation on a second display area of the display unit different from the first display area.

(19) The vehicle control method according to any one of (16) to (18), further comprising: generating a target position based on an input position of the user operation on the display unit relative to a vehicle position displayed on the display unit, the input position representing a target position, wherein the target position information includes a direction from the vehicle position to the target position in a real coordinate system.

(20) The vehicle control method according to (19), wherein the target position information includes a distance from the vehicle position to the target position in the real coordinate system.

(21) The vehicle control method according to (19) or (20), further comprising: transmitting the target position information to the vehicle.

(22) The vehicle control method according to any one of (19) to (21), further comprising: displaying the composite image such that the vehicle position on the composite image is located in the center of the display unit.

(23) The vehicle control method according to any one of (19) to (22), further comprising: changing display of the composite image such that the target position on the display unit approaches a center of the display unit as the vehicle approaches the target position in the real coordinate system.

(24) The vehicle control method according to any one of (19) to (23), further comprising: causing the vehicle to approach the target position in the real coordinate system in response to the user operation, wherein the user operation is a pinch-in operation.

(25) The vehicle control method according to any one of (16) to (24), wherein the vehicle is a hovering machine.

(26) The vehicle control method according to any one of (16) to (24), wherein the vehicle is an automobile.

(27) The vehicle control method according to any one of (16) to (26), wherein the composite image is a stitching image.

(28) A computer system, comprising: at least one processing unit; and a memory, the memory including a non-transitory computer-readable medium storing instructions that, when executed by the at least one processing unit, cause the computer system to: cause at least one imaging device attached to a vehicle to capture a plurality of images, generate a composite image from the plurality of images, display the composite image on a display unit, and operate the vehicle according to a user operation on a portion of the display unit on which the composite image is being displayed.

(29) A control device including: an image processing unit configured to generate a combined image from images captured by a mobile object equipped with an imaging device; and a movement information generating unit configured to generate movement information for moving the mobile object according to an operation on the combined image generated by the image processing unit.

(30) The control device according to (29), wherein the movement information generating unit generates movement information for moving the mobile object to a location based on a designation position designated on the combined image.

(31) The control device according to (30), wherein the movement information generating unit determines a movement direction of the mobile object on the basis of an installation state of the imaging device in the mobile object when generating the movement information.

(32) The control device according to (30) or (31), wherein the image processing unit moves the designation position in the combined image before generation of the combined image to a position in the combined image after generation of the combined image when the combined image is generated.

(33) The control device according to any one of (30) to (32), wherein the movement information generating unit generates movement information for moving the mobile object to the location based on the designation position after changing a direction of the mobile object in a manner that a front surface of the mobile object faces the location.

(34) The control device according to any one of (29) to (33), wherein the movement information generating unit generates movement information for moving the mobile object in a manner that the moving object approaches an imaging target of the imaging device on the basis of an enlargement process on the combined image.

(35) The control device according to any one of (29) to (33), wherein the movement information generating unit generates movement information for moving the mobile object in a manner that the moving object moves farther away from an imaging target of the imaging device on the basis of a reduction process on the combined image.

(36) The control device according to any one of (29) to (33), wherein the movement information generating unit generates movement information for moving the mobile object in a manner that the moving object rotates in a state in which the imaging device faces an imaging target, on the basis of a rotation process on the combined image.

(37) The control device according to any one of (29) to (36), wherein the image processing unit generates the combined image in a manner that a center of an image most recently captured by the mobile object is positioned at a center of a screen.

(38) The control device according to any one of (29) to (37), wherein the mobile object is a flying device.

(39) A control method including: generating a combined image from images captured by a mobile object equipped with an imaging device; and generating movement information for moving the mobile object according to an operation on the generated combined image.

(40) A computer program causing a computer to execute: generating a combined image from images captured by a mobile object equipped with an imaging device; and generating movement information for moving the mobile object according to an operation on the generated combined image.

REFERENCE SIGNS LIST

10 inspection system
100 hovering camera
101 imaging device
104*a* to 104*d* rotor
108*a* to 108*d* motor
110 control unit
120 communication unit
130 sensor unit
132 position information acquisition unit
140 storage unit
150 battery
200 control terminal
300 information processing device
400 wireless relay node
500 position estimation node
600 base station
700 charging station

The invention claimed is:
1. A vehicle control method, comprising:
capturing, via at least one camera attached to a vehicle, a plurality of images;
generating a 2D composite image from the plurality of images, and displaying the composite image on a display:

operating the vehicle based on flight route information; and generating the flight route information based on an input position of a user operation on the display, wherein the flight route information includes an imaging position.

2. The vehicle control method according to claim 1, wherein the imaging position includes a position at which an imaging process is executed or an imaging direction.

3. The vehicle control method according to claim 1, further comprising:

transmitting the flight route information to the vehicle.

4. The vehicle control method according to claim 1, further comprising:

generating an inspection target based on the input position of the user operation on the display.

5. The vehicle control method according to claim 4, further comprising:

generating the flight route information to keep a distance constant from the inspection target.

6. The vehicle control method according to claim 4, wherein the inspection target is an inspection region.

7. The vehicle control method according to claim 1, wherein the user operation is a touch operation, and the vehicle is configured to fly based on the flight route information in response to the touch operation.

8. The vehicle control method according to claim 4, wherein the user operation is a touch operation, and the vehicle is configured to fly based on the flight route information in response to the touch operation.

9. The vehicle control method according to claim 5, wherein the user operation is a touch operation, and the vehicle is configured to fly based on the flight route information in response to the touch operation.

10. The vehicle control method according to claim 6, wherein the user operation is a touch operation, and the vehicle is configured to fly based on the flight route information in response to the touch operation.

11. The vehicle control method according to claim 1, wherein the vehicle is a hovering machine.

12. The vehicle control method according to claim 1, wherein the vehicle is an automobile.

13. A non-transitory computer-readable medium storing instructions thereon which when executed by circuitry cause the circuitry to perform a vehicle control method comprising:

capturing, via at least one camera attached to a vehicle, a plurality of images;

generating a 2D composite image from the plurality of images, and displaying the composite image on a display;

operating the vehicle based on flight route information; and generating the flight route information based on an input position of a user operation on the display, wherein the flight route information includes an imaging position.

14. The non-transitory computer-readable medium according to claim 13, wherein the imaging position includes a position at which an imaging process is executed or an imaging direction.

15. The non-transitory computer-readable medium according to claim 13, further comprising:

transmitting the flight route information to the vehicle.

16. The non-transitory computer-readable medium according to claim 13, further comprising:

generating an inspection target based on the input position of the user operation on the display.

17. A vehicle control system, comprising:

at least one camera attached to a vehicle and configured to capture a plurality of images; and circuitry configured to:

generate a 2D composite image from the plurality of images, and display the composite image on a display;

operate the vehicle based on flight route information; and generate the flight route information based on an input position of a user operation on the display, wherein the flight route information includes an imaging position.

18. The vehicle control system according to claim 17, wherein the imaging position includes a position at which an imaging process is executed or an imaging direction.

19. The vehicle control system according to claim 17, wherein the circuitry is configured to transmit the flight route information to the vehicle.

20. The vehicle control system according to claim 17, wherein the circuitry is configured to generate an inspection target based on the input position of the user operation on the display.

* * * * *